(12) United States Patent
Trudeau

(10) Patent No.: US 11,453,145 B2
(45) Date of Patent: Sep. 27, 2022

(54) APPARATUS AND METHODS FOR TRUNCATING ELONGATED MEMBERS

(71) Applicant: Leon Trudeau, Broussard, LA (US)

(72) Inventor: Leon Trudeau, Broussard, LA (US)

(*) Notice: Subject to any disclaimer, the term of this patent is extended or adjusted under 35 U.S.C. 154(b) by 49 days.

(21) Appl. No.: 16/741,372

(22) Filed: Jan. 13, 2020

(65) Prior Publication Data

US 2021/0213644 A1 Jul. 15, 2021

(51) Int. Cl.
*B28D 1/22* (2006.01)
*E02D 9/00* (2006.01)
*B26D 1/08* (2006.01)
*B26D 1/00* (2006.01)

(52) U.S. Cl.
CPC .............. *B28D 1/222* (2013.01); *B26D 1/08* (2013.01); *E02D 9/005* (2013.01); *B26D 1/0006* (2013.01); *B26D 2001/0033* (2013.01)

(58) Field of Classification Search
CPC .... B26D 1/08; B26D 2001/0033; B26D 3/16; E02D 9/005; E02D 9/04; B28D 1/22; B28D 1/222; B23D 23/00
USPC .............................. 30/346–357; 83/955, 694
See application file for complete search history.

(56) References Cited

U.S. PATENT DOCUMENTS

| | | | |
|---|---|---|---|
| 402,381 A * | 4/1889 | Aiken | |
| 5,139,006 A | 8/1992 | Trudeau | |
| 5,413,086 A | 5/1995 | Trudeau | |
| 6,058,611 A * | 5/2000 | Rickard | B26B 9/02 30/329 |
| 6,925,920 B1 * | 8/2005 | Borosic | B26D 7/2628 30/339 |
| 7,351,010 B1 * | 4/2008 | Kelly | B23D 21/00 405/156 |
| 2005/0194000 A1 * | 9/2005 | Todack | B28D 1/222 125/23.01 |
| 2005/0274249 A1 | 12/2005 | Trudeau | |
| 2010/0043609 A1 * | 2/2010 | Franze | B23D 21/00 83/13 |
| 2012/0193556 A1 * | 8/2012 | Yadav | E21B 33/063 251/1.3 |
| 2017/0355027 A1 * | 12/2017 | D-Antuono | B23D 35/002 |
| 2020/0290136 A1 * | 9/2020 | Birkeland | B23D 21/00 |

FOREIGN PATENT DOCUMENTS

DE 102018117217 A1 * 1/2019 ........... B23D 35/008

* cited by examiner

*Primary Examiner* — Nhat Chieu Q Do
(74) *Attorney, Agent, or Firm* — Fitch, Even, Tabin & Flannery, LLP

(57) ABSTRACT

A cutting tool for truncating elongated structural members has a frame with a pair of parallel siderails connected at a first end by a support plate and at a second end by a removable end gate, the frame having an open center adapted to receive the structural member therethrough. The truncating is performed by a fixed penetrating cutting edge on an end gate and a driven penetrating blade slidably disposed within the frame to advance towards the end gate. The end gate has two integral penetrating cutting edges pointing in opposite directions. The driven penetrating blade and the fixed penetrating cutting edge may have concave cutting edges relative to one another and configured to be adjacent to one another along the travel of the driven penetrating blade. Alternately, an end gate second cutting edge may be directed to the opening within the frame and have a piercing V-shaped cutting edge.

10 Claims, 20 Drawing Sheets

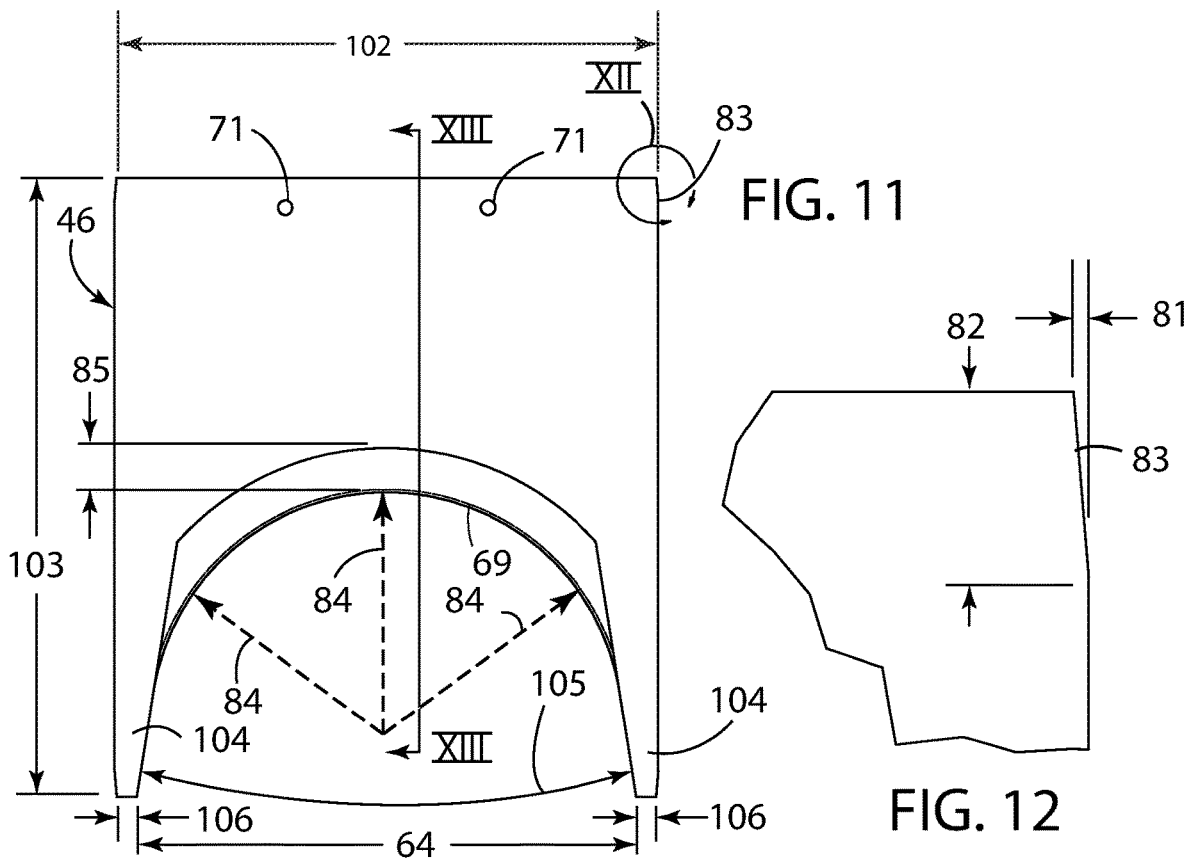
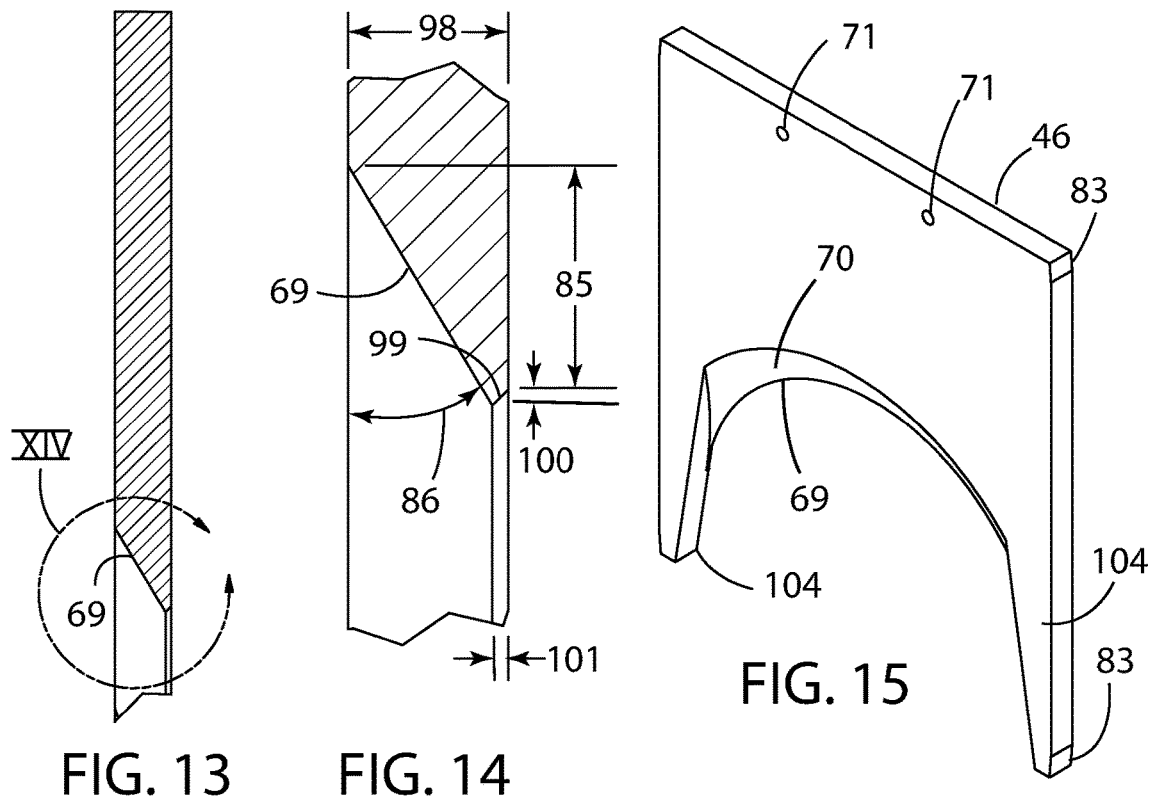
FIG. 11
FIG. 12
FIG. 13
FIG. 14
FIG. 15

APPARATUS AND METHODS FOR TRUNCATING ELONGATED MEMBERS

FIELD

Presented herein are embodiments to truncate elongated members, and in particular, embodiments, methods and systems to truncate elongated structural members of various configurations and materials including but not limited to metal structural members which are tubular and hollow, using a cutter having an end gate which is configured to allow a user to select among at least two cutting edges on the end gate, and having concaved shaped opposing cutting edges, whereby elongated members can be truncated which are up to 95 percent in outside diameter relative to the distance between frame side rails and the length of the interior space formed between the center of frame blade cutting edge and the center of the end gate cutting edge.

BACKGROUND

In various industries, it is occasionally necessary to cut, deform, break, deconstruct, decommission or sever (collectively and individually referred herein as "truncate") elongated members at desired points along its length. Examples of elongated members can include structural members of oil platforms, pilings, piers, bridges, refineries, power plants, and the like. By way of example, in the offshore petroleum industry, during the decommissioning of a drilling or production platform, it is frequently important to truncate the 'legs'/pilings of the platform as close as possible to the seabed. Conventional methods for performing such tasks have utilized divers working with thermal cutting tools, wire saws and/or explosives. These conventional methods can be dangerous, time consuming, costly and cause significant environmental impact. For example, the use of a wire saw can cause a significant amount of fine particulate matter that can become airborne or seaborne.

One attempt to solve these deficiencies is the use of a gated cutter. The truncation of elongated members using cutters of various configurations using gated cutters are described in, for example, U.S. Pat. Nos. 5,139,006, 5,413,086 and US PUB 20050274249A1, the entire specifications of which are incorporated herein by reference. Despite these advances, further improvements are possible and desired.

SUMMARY

Accordingly, to advance at least the aforementioned deficiencies in the art, presented herein are embodiments to truncate elongated members using a gated cutter having in one embodiment opposed beveled concave shaped blades and the option allow a user to select among at least two cutters mounted on the end gate. In particular, presented herein are embodiments, methods and systems to truncate elongated structural members of various configurations and materials including but not limited to metal structural members which are tubular and hollow, using a cutter having an end gate configured to allow a user to select among at least two cutting edges on the end gate, and having concaved shaped opposing blades, whereby elongated members can be truncated which are up to the outside diameter relative to the distance between frame side rails and the length of the interior space formed between the center of frame blade cutting edge and the center of the end gate cutting edge.

The present embodiments allow for an apparatus, methods and systems for the truncation of elongated structural members of various configurations and materials, including but not limited to metal structural members which are tubular and hollow, using a cutter having an end gate configured to allow the selection from at least two cutting elements. According to one approach, the cutter combination includes opposing concave shaped single beveled blades.

According to one approach a cutting tool for truncating elongated structural members has a frame with a pair of parallel siderails connected at a first end by a support plate and at a second end by a removable end gate, the frame having an open center adapted to receive the structural member therethrough. The truncating is performed by a fixed cutting edge on an end gate and a cutting edge on a driven penetrating blade slidably disposed within the frame. The end gate has at least two penetrating cutting edges pointing in opposite directions wherein the driven penetrating cutting edge and the fixed penetrating cutting edge are concave relative to one another and configured to be adjacent to one another along the travel of the driven penetrating blade.

According to one approach, the cutting edge of the driven penetrating blade and the fixed penetrating blade may have a single bevel. The cutting edge of the driven penetrating blade and the fixed penetrating blade can define the frame opening.

According to one approach, the concave arc of the driven penetrating blade can be circular. Thus, the frame opening can be circular. According to one approach, the concave shape of the driven penetrating blade can be oblong.

According to one approach, the end gate may have a second fixed cutting edge at a second side of the end gate. The second fixed cutting edge is preferably directed to the frame open center when rotated 180 degrees along its length.

The end gate may be secured to the frame by two removable pins.

According to one approach, the end gate may have three cutting edges arranged in a triangle with each cutting surface on the same plane.

According to one approach, the end gate is pivotable about one pin and locked by a second pin and the end gate pivots about the pivot pin by a hydraulic cylinder. The blade configuration may have a predetermined concave cross-sectional profile and where the cutting edges of the blades define a collective concave profile corresponding to the profile of the structural member According to one approach, a method for cutting an elongated member is provided having the steps of: providing a cutting tool having a driven penetrating blade that is a substantially first flat blade slidably disposed between slidable mounts, the driven penetrating blade having a bevel on a concave shaped cutting edge relative to an end gate; and providing a cutting tool having a cutting edge on the end gate; mounting the cutting edges around a pile and at a selected position along the pile with the cutting edges confronting the pile; and driving the cutting edges of the blades into a surface of the pile around the periphery of the pile.

According to one approach, the step of mounting the blades around the pile includes opening the end gate; moving the cutting tool so that the pile is situated to a back cutting edge of the driven blade; and closing the end gate.

A cutting tool for truncating elongated structural members is also provided having a cutting tool having a frame, with two substantially parallel side rails, a cross member attached to and extending between one end of the side rails, and an end gate attached to and extending between a second end of the side rails; a substantially flat first blade slidably disposed between the side rails, the blade having a concave cutting edge, the concave cutting edge facing the end gate; a substantially flat second cutting edge on the end gate forming a second blade, the second cutting edge being concave, the concave second cutting edge facing the first blade cutting edge; where said cutting edges form an opening within the frame configured to surround the elongated structural member; and mechanism for moving the first blade toward the second blade, whereby said movement causes the first blade to truncate the elongated structural member extending through said frame opening, between the first blade and the second blade. According to one approach, the end gate is removably secured to ends of the side rail.

Other features will become more apparent to persons having ordinary skill in the art to which the assemblies pertain and from the following description and claims.

BRIEF DESCRIPTION OF THE DRAWINGS

FIG. 11 is a top view of the frame blade of FIG. 10;

FIG. 12 is a close up of area XII of FIG. 11;

FIG. 13 is a cross-sectional side view of the frame blade of FIG. 11 taken along section lines XIII-XIII of FIG. 11;

FIG. 14 is a close-up side view of area XIV of FIG. 13;

FIG. 15 is a rear top perspective view of a frame blade to the cutting tool of FIGS. 1 and 6;

FIG. 26;

Figure 1:
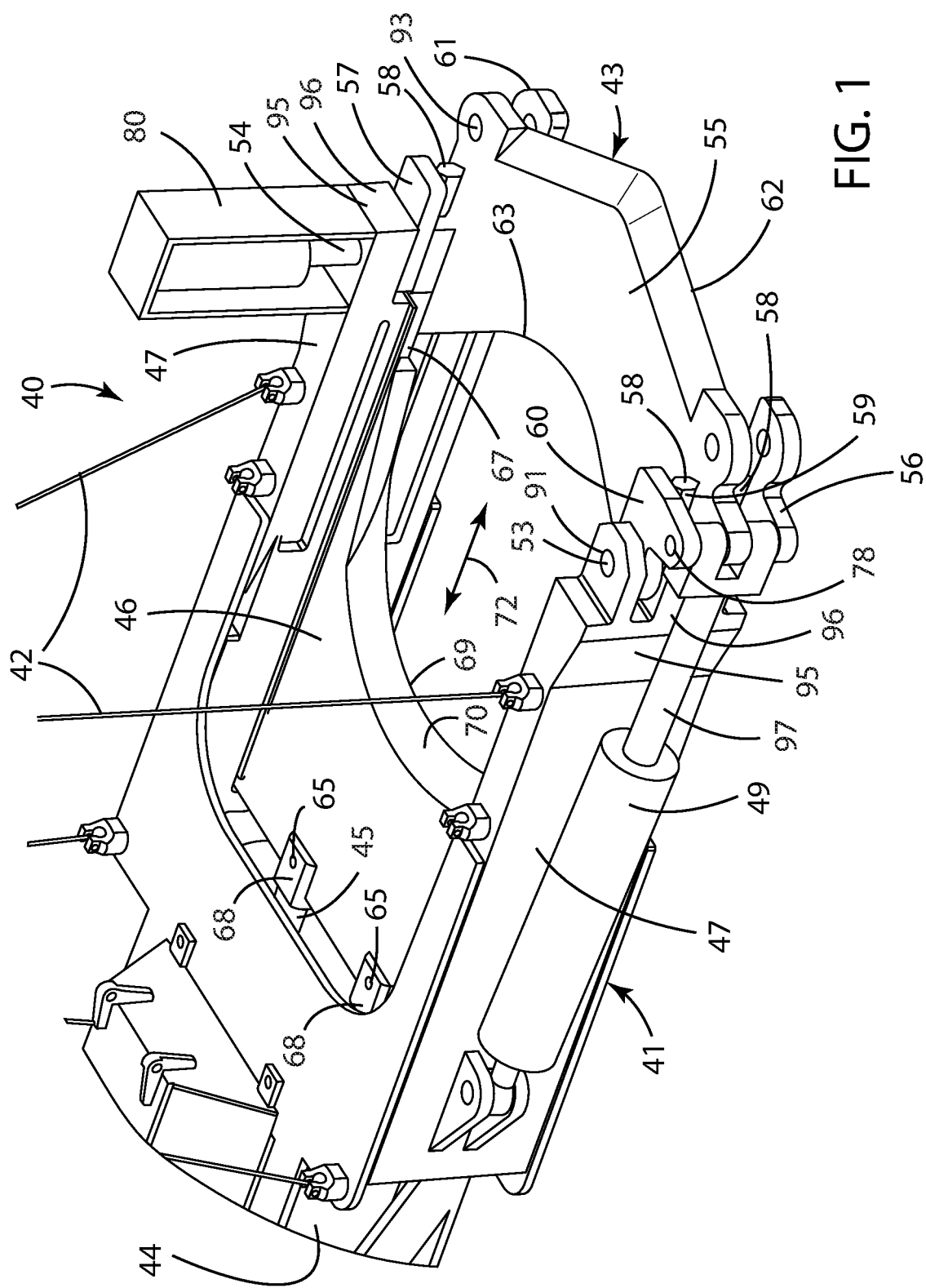
FIG. 1 is a top front perspective view of a cutting tool according to one approach of the present embodiments with its end gate in a closed position and a first end gate cutting edge directed to a frame interior.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Presented herein are embodiments to truncate elongated members, and in particular, embodiments, methods and systems to truncate elongated structural members of various configurations and materials including but not limited to metal structural members which are tubular and hollow, using a cutter having an end gate which is configured to allow a user to select among at least two cutting edges on the end gate, and having concaved shaped opposing blade, whereby elongated members can be truncated which are up to 95 percent in outside diameter relative to the distance between frame side rails and the length of the interior space formed between the center of frame blade cutting edge and the center of the end gate cutting edge.

For ease of understanding the present embodiments, non-limiting examples of elongated members described herein include hollow cylindrical members, such as tubular metal pilings. It is understood that the present embodiments are not limited for use in truncating hollow cylindrical members, but may be used for truncating elongated structural members having various cross-sectional shapes and made from various structural materials such as wood, metals, concrete, and the like and combinations thereof. Examples of elongated members can include structural members of oil platforms, pilings, piers, bridges, refineries, power plants, structural lattice work, and the like. Also, the terms cut, deform, break, deconstruct, decommission or sever are used throughout the specification when referring to any or all activities to cut, deform, break, deconstruct, decommission and/or sever any elongated members.

The present embodiments provide numerous configurations and greatly increase the functionality and efficiency for a truncating tool for elongated members than previously known in the art. For example, according to one approach, where the configuration includes dual opposing and beveled concave blades, cylindrical elongated members of larger diameters can be severed than previously known for similar frame dimensions. As described herein, the term "concave" may refer to a variety of configurations where the cutting edge of the blade extends behind the center of the blade in relation to the direction of truncation. Non-limiting examples of a concave blade shape may include circular (round), oblong and/or "football", "V" shaped, partially "V" shaped and combinations thereof. In this configuration, the blades are configured to penetrate a workpiece and may surround the elongated member before truncating. This configuration thus allows for a smaller frame of the device (e.g., shorter side frame rails and narrower width) to achieve the same results as were accomplished with prior cutters. For example, the frame side rails can be up to 50 percent shorter than previous cutters. The weight of a smaller device can be, for example, half the weight of a prior cutter needed to sever an elongated member of similar diameter.

According to one approach, when the end gate is closed and the frame blade is in its retracted position, the device of the present embodiments having concave blades can provide a frame defining an internal opening that may surround an elongated member of almost equal diameter (up to about 95 percent) in width and length to the internal opening.

According to one approach, bevels on the cutting edge may be provided. Where a single bevel is used, during truncation, the angle of the bevel is positioned to direct the truncated member away from the cutter, which allows for easier removal once the cut is completed and the elongated member is freed. The concave blades are configured so that the leading edges of the blades are adjacent during the truncation to provide the clean shear needed to the cut the elongated member. The angle of the bevel on the blades may be about 25-75 degrees (e.g., 25-75 degrees).

According to one approach, the end gate may be held in place by pins, which may be removed by the user and/or through the use of pin pull mechanisms situated at the distal ends of each of the two side rails. The advantage of these configurations is the quick removal of the end gate. As described herein, multiple blades may be formed on the same end gate. In one example, end gate blades may be extending away from each other on the same plane (i.e., by 180 degrees). In these configurations, a different blade may be directed to the internal opening of the cutter frame as needed. For example, a concave blade may be positioned to extend from one side of the end gate and a piercing and/or double beveled blade may positioned extending away from the concave blade in the opposite direction. The piercing blade may be needed to cut elongated members with smaller diameter but thicker walled, more dense, solid elongated combinations thereof and the like. Also, there may be dual concave blades to reduce down time if by chance the first blade breaks in the field.

According to one approach, the end gate can swing open using a hydraulic arm attached to one side of the gate and a pin pull mechanism to remove the pin on the other of the end gate. In use, this configuration allows the present cutter to approach the elongated member from the side and envelop the member in its interior space when the end gate is closed. To remove this end gate configuration, the pin pull can release one side of the end gate. The end gate can be swung open followed by removal of the pivot pin and the hydraulic arm pin to free the end gate from the cutter.

In another approach (FIG. 8), the end gate is held in place by two pins, which may or may not be removable by pin puller mechanism(s). In use, the end gate remains closed but can still be lowered over the end of an elongated member to be truncated such as piers or pilings extending out of water. In this instance, to remove the end gate only the two pins need to be removed to free the end gate. This design provides a simpler device which may be more reliable in the field since the user is not reliant on the hydraulic arm of the end gate. Once the gate is removed, to change the interiorly directed blade, the end gate in one approach is simply rotated 180 degrees on its ends and reinstalled.

In the present embodiments, matching brackets are installed on the sides of the end gate to allow for the same pin placement and mounting orientation of the end gate blade relative to the cutter frame, irrespective of the blade selected for cutting. It is also noted that the blades are positioned on the end gate and beveled so that the cutting edge of the gate blade is adjacent to the frame blade while in use. The blade and the blade brackets of the end gate are spaced by spacers to allow mounting in the space between the brackets on the ends of the frame side rails. For example, the spacers can be about 80-97 percent in thickness relative to the space provided on the ends of the frame side rails. The spacers can be blocks welded on the end gate blade and the end gate brackets. In a preferred embodiment, the blocks can be beveled to allow a deeper penetration of the weld.

Figure 36:
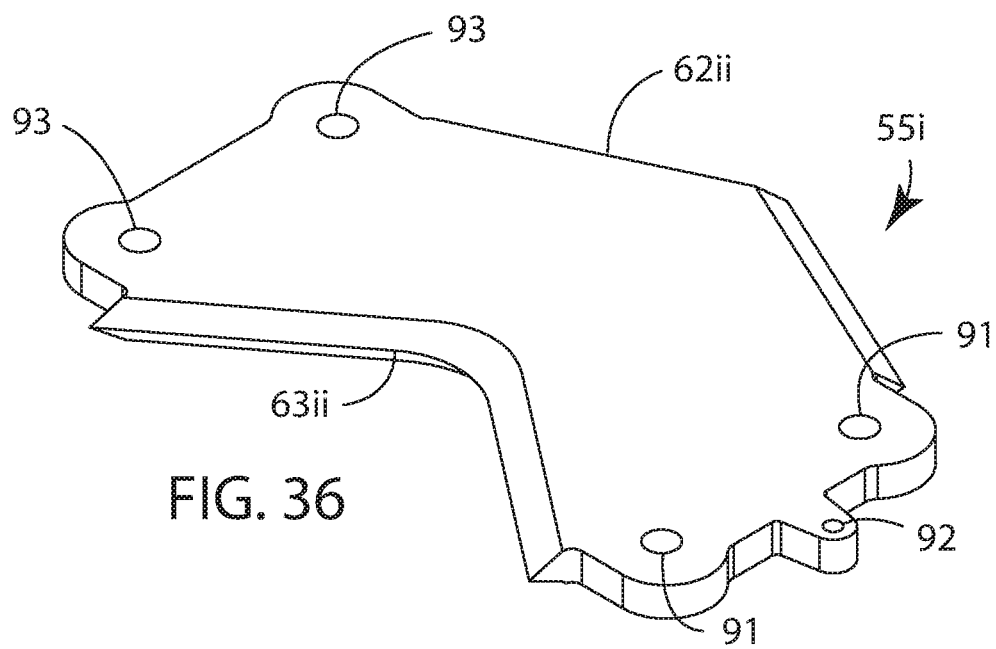
FIG. 36 is a top perspective view of the blade of the end gate assembly of the present embodiments according to another approach.

In the preferred embodiments, the frame blade and the end gate blade edges should have reciprocal beveling. Accordingly, if the frame blade cutting edge has a single bevel, the end gate blade should have a single bevel and be positioned so that the cutting edges of each blade are adjacent when in use. If the frame gate cutting edge has a two or more bevels, the end gate blade should have reciprocal two or more bevels (e.g., see FIGS. 17 and 36). It is noted though that the shape of the cutting edge does not need to have reciprocal shapes. Accordingly, a concave frame blade can be used with a rounded concave end gate blade, an angled end gate blade, an arrow shaped end gate blade, and so on. It is noted though that the blade configurations is able to provide the desired cutting of the elongated member. Preferably, this would mean complete severing of the elongated member, though in some instance this may not be possible or even desired. For example, a concave frame blade with a piercing arrow blade on the end gate may be best to pierce the elongated member to start a cut.

In short, the present embodiments provide more versatility, functionality and efficiency in a smaller footprint with less weight than was previously required in prior cutters.

Figures 8, 9:
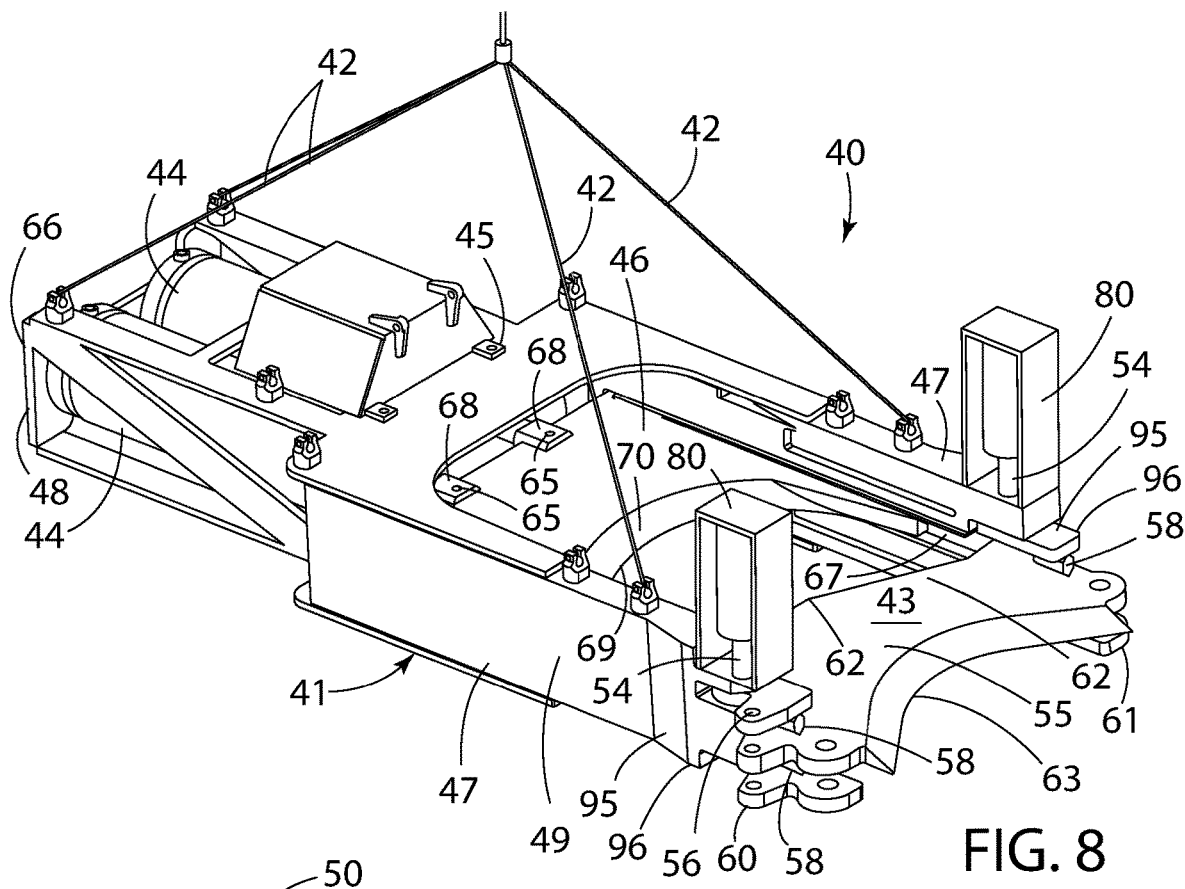
FIG. 8 is a top front perspective view of a cutting tool according to another approach of the present embodiments with its end gate pinned in position and a first end gate cutting edge directed to a frame interior.
FIG. 9 is a perspective view of a cutting tool of FIG. 1 in use.
Figure 10:
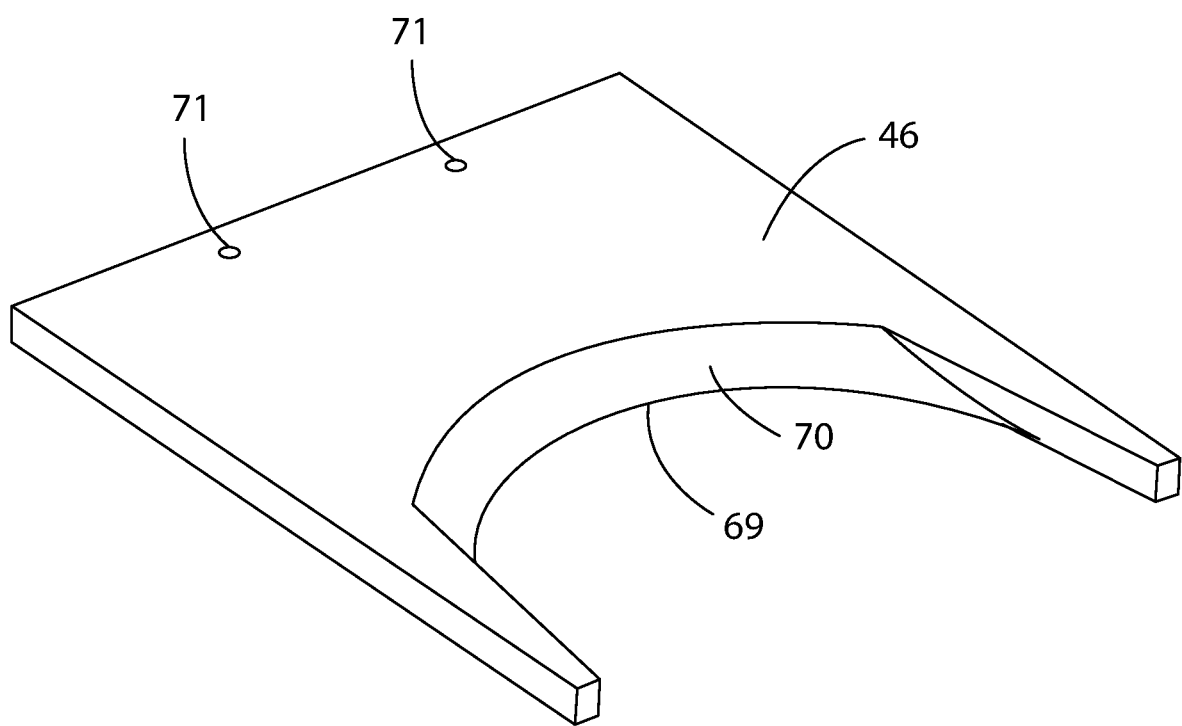
FIG. 10 is a top perspective front view of a frame blade to the cutting tool of FIGS. 1 and 6.

Turning to the figures, as shown in FIG. 9, cutting tool 40 can be suspended from cables 42 on an exemplary crane 50 on a platform such as a truck, a rail car, a barge 52, or the like to move the cutter into place to truncate an elongated member 51. FIGS. 1-4 depict an exemplary cutting tool 40 having two concave blades and a swinging end gate according to the present embodiments for truncating an elongated structural member and the like. As shown, cutting tool 40 generally includes a frame 41, at least one hydraulic cylinder 44 having a cylinder rod 45 to drive frame blade 46 by telescopic extension from the hydraulic cylinder 44 to and from an extended and retracted position. The components of cutting tool 40 are preferably made of metal or some other material that is strong, rigid, and durable. The materials must be able to accommodate the pressures of the hydraulic system to drive the frame blade 46 through the elongated member. As shown, frame blade 46 attaches to the hydraulics via frame blade brackets 68 attached to hydraulic rod 45 via cylinder pins 65 extending through cylinder pin holes 71 (See e.g., FIG. 11).

Figure 5:
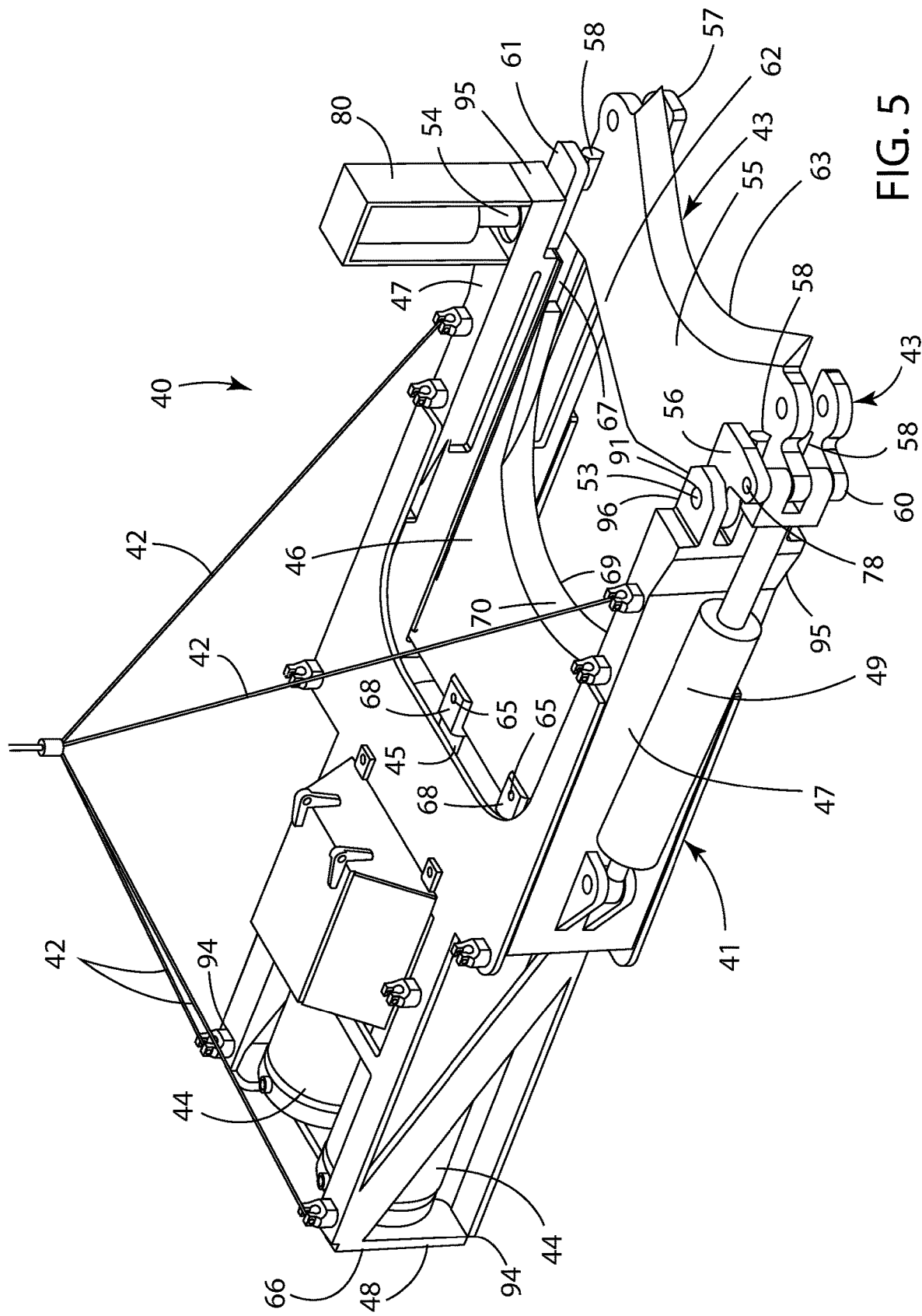
FIG. 5 is a top front perspective view of a cutting tool according to one approach of the present embodiments with its end gate in a closed position and a second end gate cutting edge directed to a frame interior.

Frame 41 of cutting tool 40 may generally include a cross member 48 (FIG. 3 or 5), two structurally mirror image side rails 47, and an end gate assembly 43. Cross member 48 preferably extends between side rails 47 and is attached to a first end 94 of both side rails 47. Cross member 48 is preferably constructed of support plate 66 and capable of withstanding the forces from the hydraulic cylinders pushing through the elongated member. As shown, at least one user controllable (controller not shown) cylinder 44 is secured at one of its ends to support plate 66. FIG. 5 shows the preferred arrangement of two cylinders 44 secured to support plate 66.

Referring to FIGS. 1-5, a cylinder rod 45 reciprocally extends from each cylinder 44, and is attached at one end to blade 46 using brackets 68 and bolts or pins 65. Changes in fluid pressure inside each cylinder 44 cause cylinder rod 45 to move in and out of cylinder 44 to facilitate back and forth movement of blade 46 along channels 67 in side rails 47. The total distance traveled by cylinder rod 45 can be changed to adapt to the size of the structural member to be truncated and the configuration of the frame blade and end gate blade.

Figure 2:
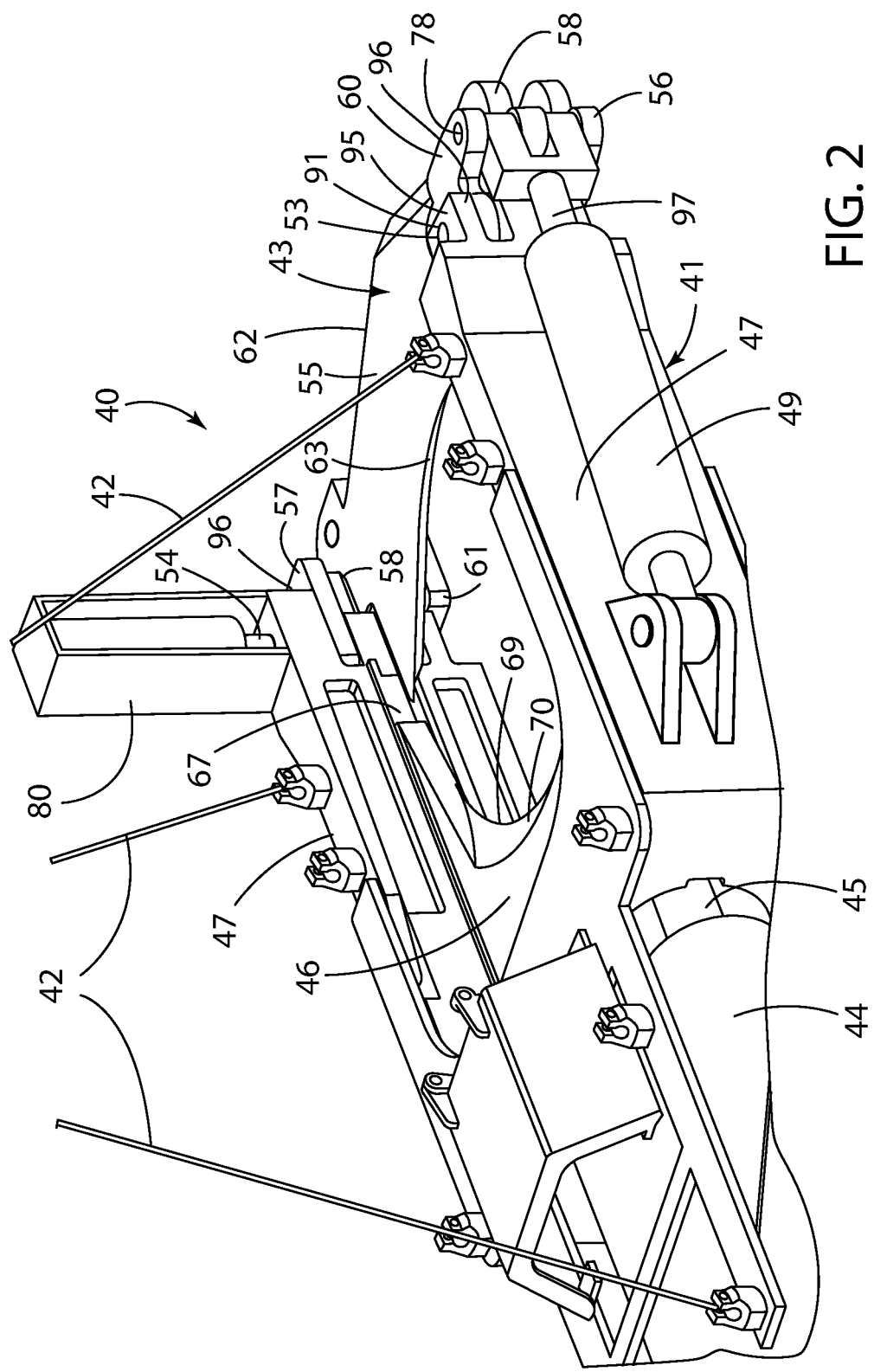
FIG. 2 is a top rear perspective view of a cutting tool of FIG. 1 with its end gate in a closed position.
Figure 3:
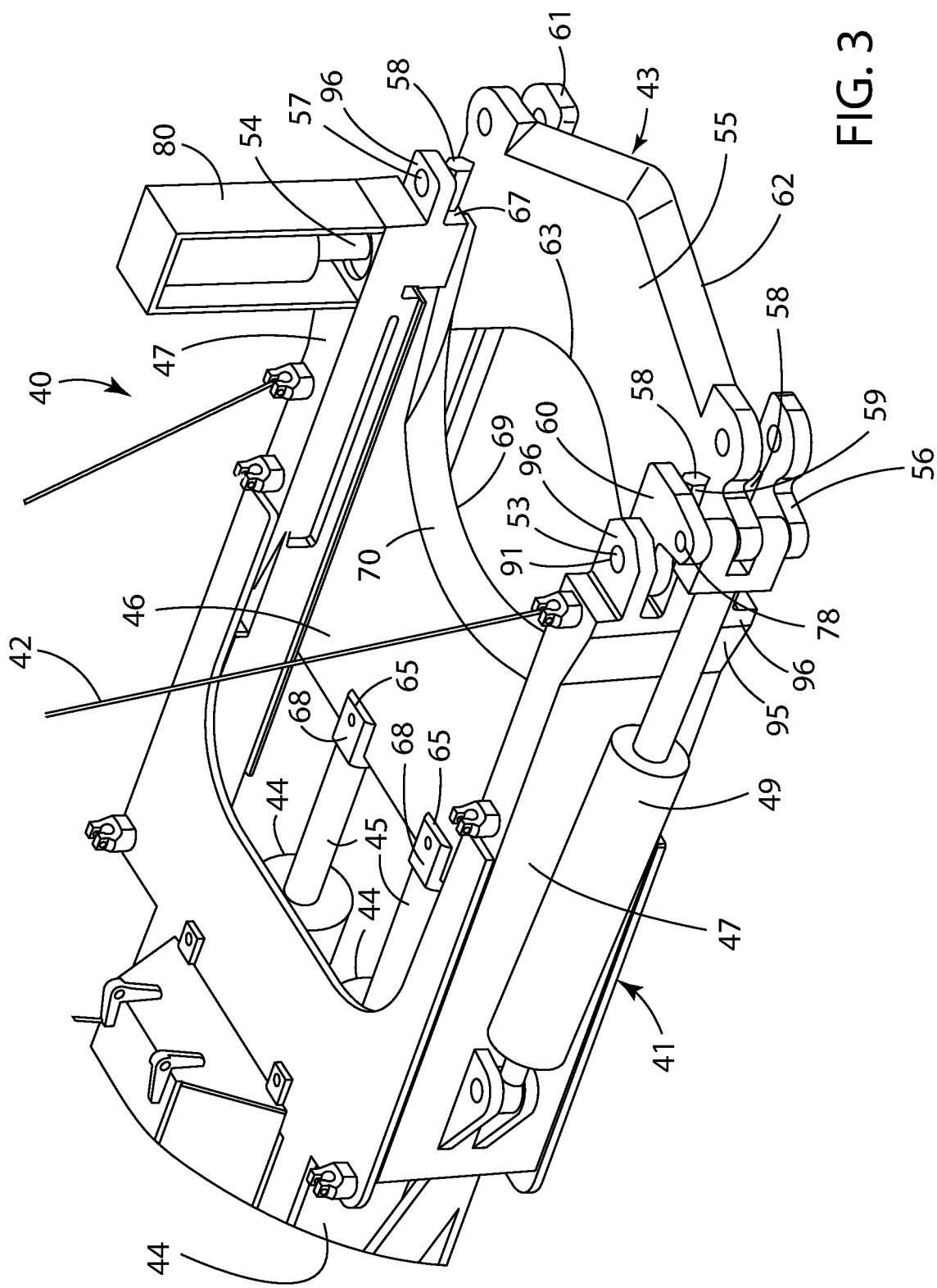
FIG. 3 is a top front perspective view of a cutting tool of FIG. 1 with its end gate in a closed position and its frame blade partially extended.
Figure 4:
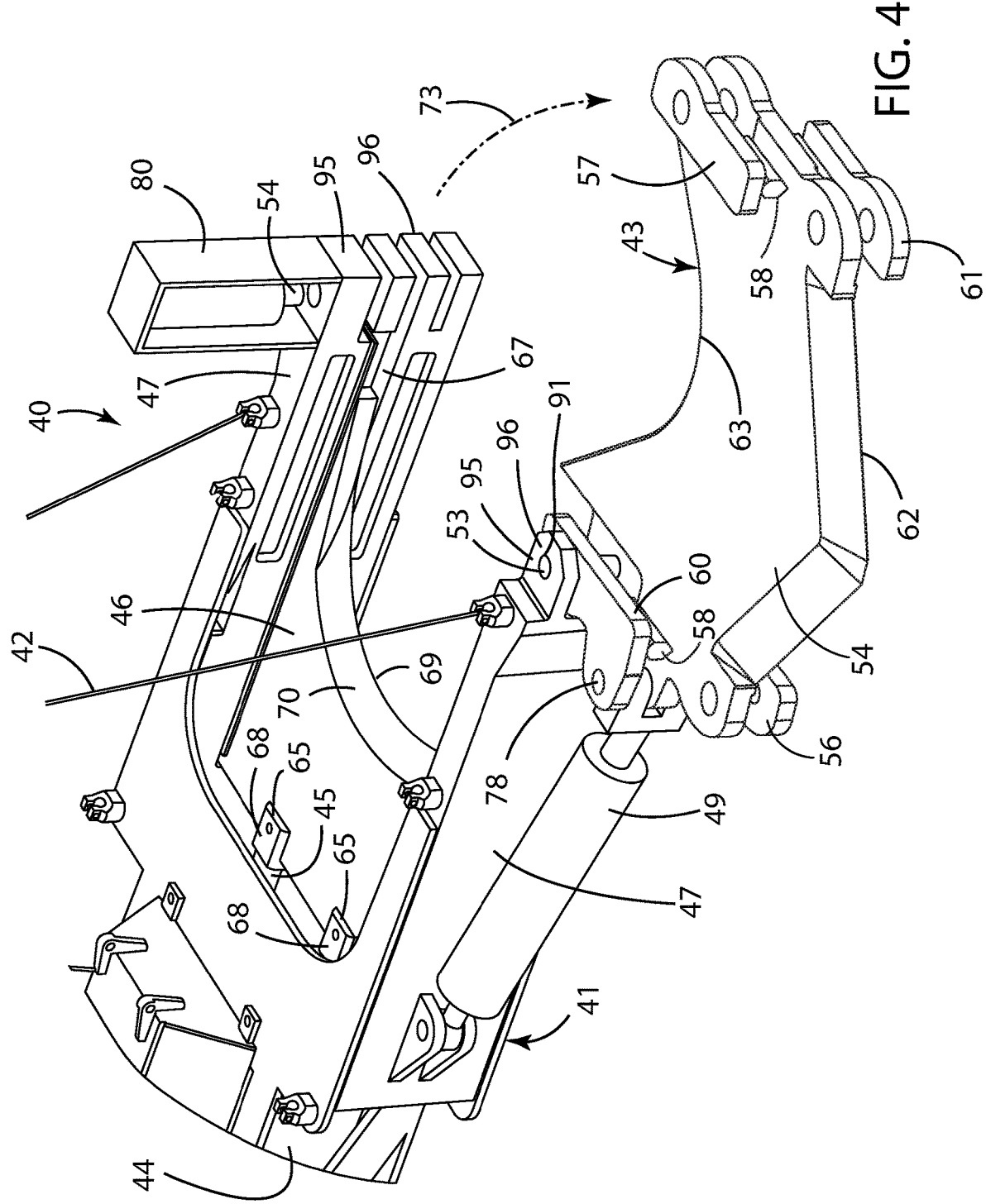
FIG. 4 is a top front perspective view of a cutting tool of FIG. 1 with its end gate in an open position.

Referring to FIGS. 1-3, side rails 47 preferably extend from cross member 48 to a side rail second end 95 to where end gate 43 is removably attached. Each side rail 47 has an inwardly facing channel 67 to accommodate a lateral edge of blade 46, which slides along channels 67 to and from end gate 43 as it extends and retracts. Second ends 95, as shown, have mounting brackets 96 to attach end gate 43. End gate 43, when installed, extends between side rails 47.

In the embodiment of FIGS. 1-5, end gate 43 is preferably removably secured to side rails 47 using bolts or pins, which are capable of withstanding the shearing stress generated during the truncating process. As shown, pin 53 serves as a pivot point for end gate 43 to swing out from the frame and locking pin 54 holds the end gate in place while in use. Locking pin 54 may optionally be attached to a user controllable pin pull 80 device to allow the gate to swing open (73) on pivot pin 53. End gate 43 may pivot on pivot pin 53 when a user controllable hydraulic arm 49 is actuated to extend or retract end gate hydraulic rod 97. According to another approach, FIG. 8 shows dual mechanized pin pulls to release end gate 43.

The blades for the present embodiment have cutting edges preferably made of a very hard material, such as the type of steel referred to as tool steel or tool die steel. Cutting edges can also be made of tool carbides, including, for example, tungsten (wolfram) carbide, WC. As those skilled in the art will appreciate, the necessary level of hardness of the material used to make the cutting edges depends on the dimension, structure, and properties of the structural member being truncated. Cutting edges should be sufficiently hard to truncate several structural members without any noticeable wear to cutting edge.

Frame blade 46 is a substantially flat metal plate extending between side rails 47 with a leading cutting edge 69 having a bevel 70. Blade 46 must be thick enough and rigid enough not to buckle during the truncation process. The lateral edges of blade 46 are preferably thick enough to substantially fill channels 67 of side rails 47 so as to prevent dust and the like from accumulating within channels 67.

As shown in the figures, frame blade 46 cutting edge 69 can be concave in shape and having a bevel 70. The angle of the bevel on the blades may be about 25-75 degrees (e.g., 25-75 degrees), but preferably about a 25-40 degrees bevel. By way of example, FIG. 11-15 show an exemplary frame blade 46 according to the present embodiments. By way of example to understand ratios and proportion of frame blade 46, frame blade 46 can have: beveled corners 83 that are about 1.5 (82) inches along the length of the frame bade and 0.125 inches (81) in width; a frame blade overall width 102 of about 37 inches; a length 103 of about 42 inches; a frame blade thickness 98 of about 2 inches; a bevel 70 extending about 3 inches (85) (or alternately having an angle of about 25-45 degrees (86)); a cutting edge 69 having round concave arc relative to end gate 43 having a radius 84 of about 16 inches (allowing for a work piece of about 32 inches); and frame blade extensions 104 internally flared to about 108 degrees (105) from the sides of the cutting edge to the end of the frame blade of about 1.5 inches (106) in width on each side to allow stable blade travel in side rail channels 67 and to guide a work piece towards the cutting edge. The distal opening 64 of frame blade 46 is thus about 33.875 inches. The blade extends about one inch into the side rail channels 67. This means that the spacing (75) between the side rails 47 can be about 34 or 35 inches to accommodate a workpiece having a 32-inch outer diameter 74. The other dimension to reduce the size and weight of the cutting tool 40 is the length of the side rails 47 needed to receive a 32 inch work piece in its interior space. This is limited by the dimension 76 which is the span between the most distal regions of the cutting edges of frame blade and gate blade. This dimension also delimits the travel length in direction 72 needed by the hydraulic rod to extend frame blade 46 so that the center 107 of concave cutting edge 69 of frame blade 46 passes over the center 108 of concave cutting edge 63 of end gate 43. In this instance dimensions 74 and 75 can be the same. In other words, the longitudinal opening of the interior area of the cutting tool 40 can be about 33.875 inches in length. It is noted though that these exact measurements are not the only possible dimensions so long as there is about at least an extra inch of space in length and width of the interior opening relative to the workpiece outer diameter 74.

An optional second bevel 99 being about 0.20 inches (101) thick extending back about 0.20 inches (100). This resultant frame blade is thus configured to cut an elongated member having an outside diameter of about 32 inches. It is noted that the dimensions described are merely exemplary of one possible embodiment, which can also be scaled up and scaled down to accommodate different cutter frames.

In a preferred embodiment of the present invention, cutting edge 69 of blade 46 has a wedge shape leading to a cutting edge on the lower side of the frame blade. This allows for the work piece to be tilted away from the cutter 40 while in use. As will be explained below, end gate blade is reciprocal in configuration in that the cutting edge here needs to have its cutting edge on the top side of the end gate blade so that the cutting edges are adjacent while in use.

Figure 16:
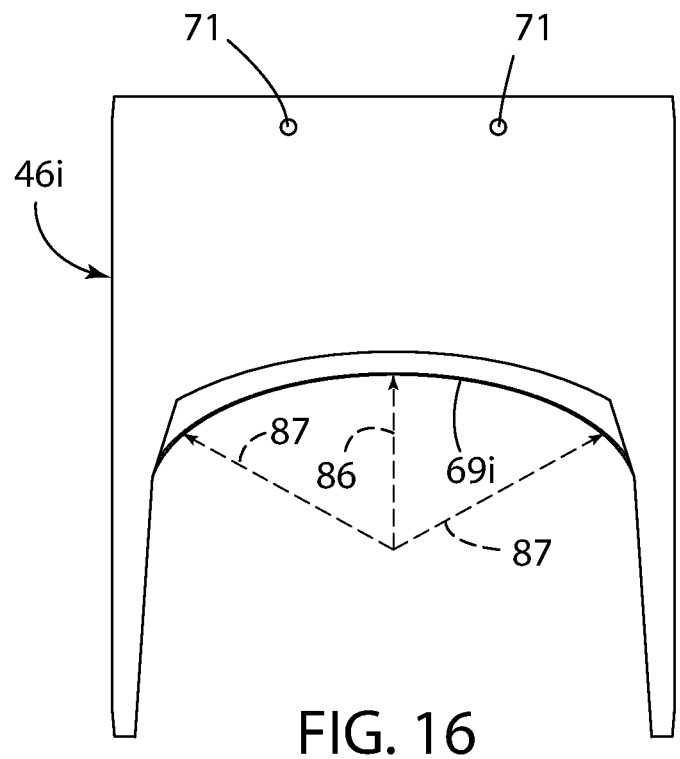
FIG. 16 is a top view of a frame blade according to another approach.
Figure 17:
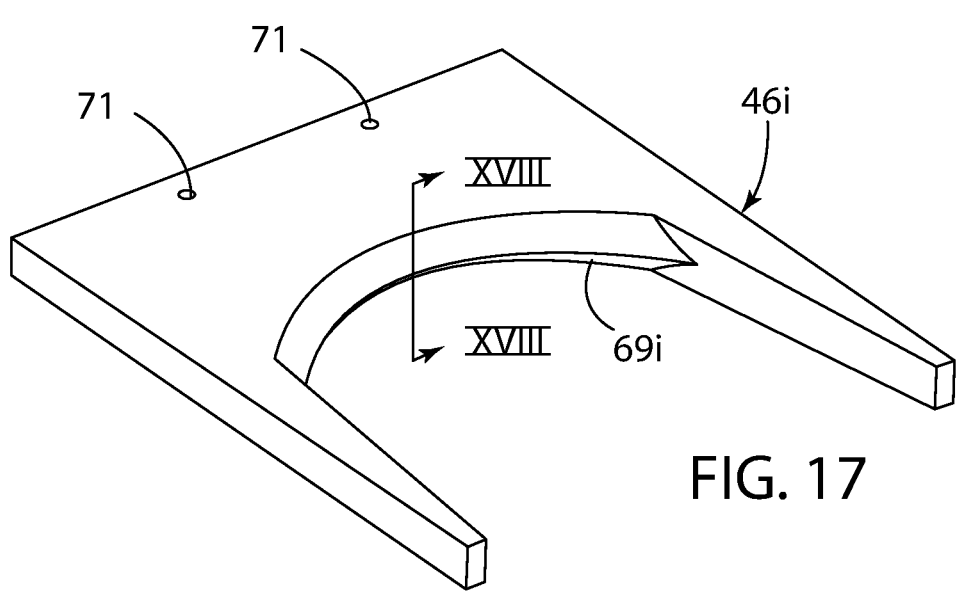
FIG. 17 is a top perspective front view of a frame blade to the cutting tool of FIG. 16.
Figure 18:
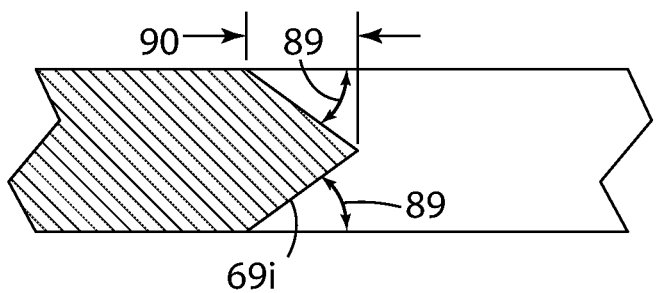
FIG. 18 is a cross-sectional side view of the frame blade of FIG. 17 taken along section lines XVIII-XVIII of FIG. 17.
Figure 19:
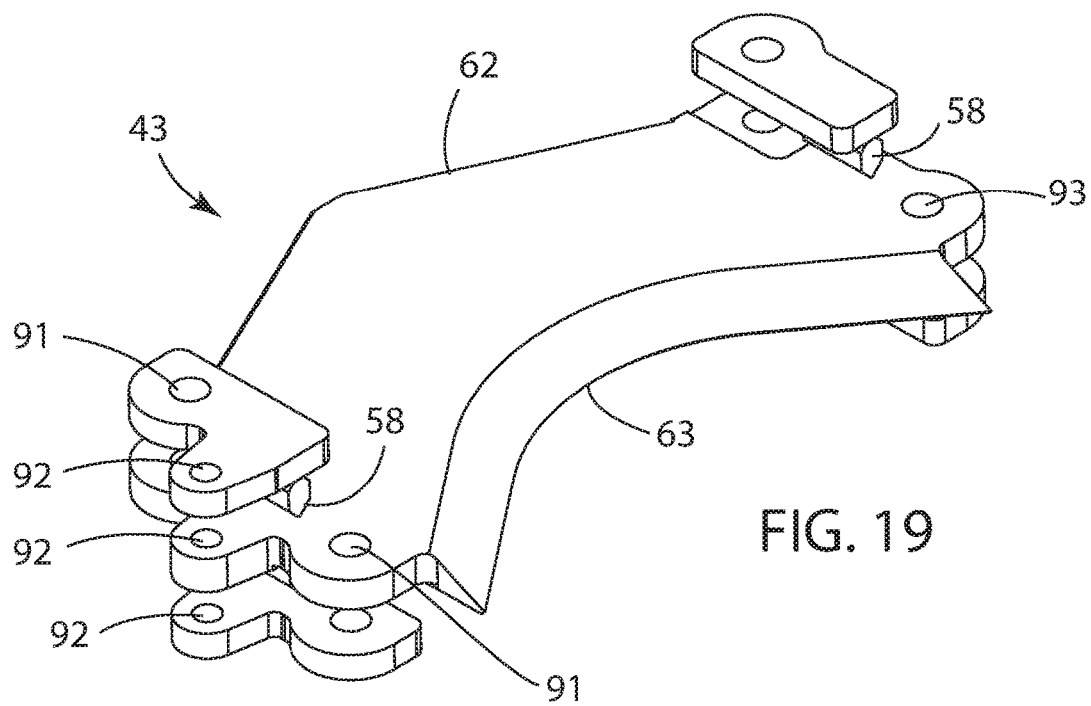
FIG. 19 is a rear perspective front view of the end gate assembly of the present embodiments according to FIG. 1.
Figure 20:
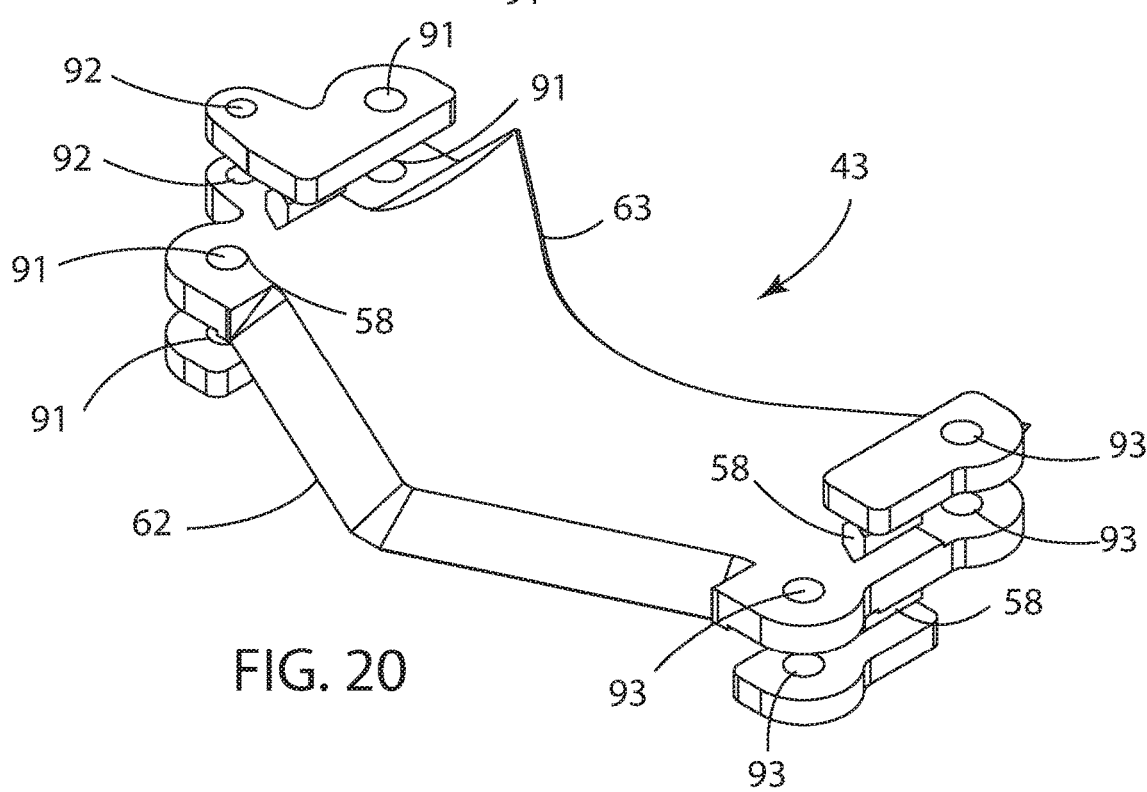
FIG. 20 is a top perspective front view of the end gate assembly of the present embodiments according to FIG. 1.
Figure 21:
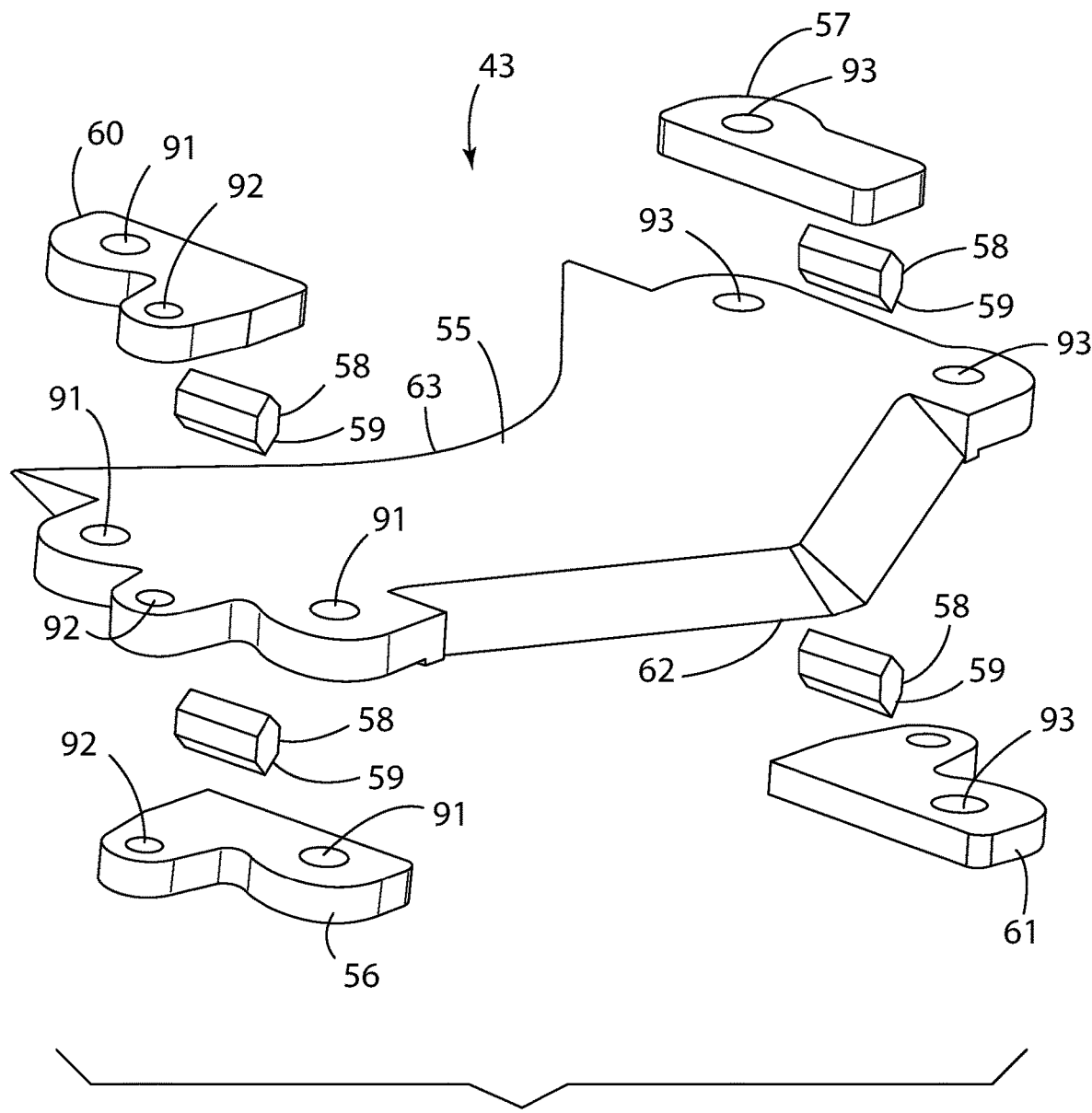
FIG. 21 is an exploded top perspective view of an end gate assembly of the cutting tool of FIGS. 19-20.
Figure 22:
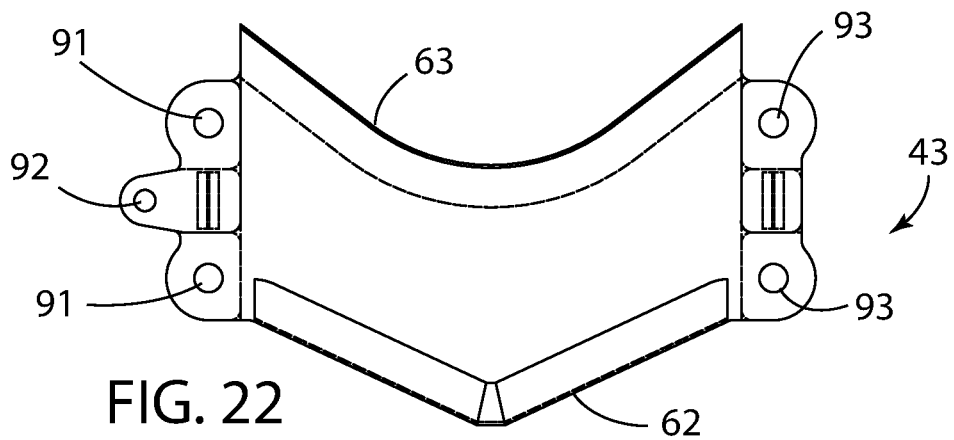
FIG. 22 is a bottom view of the end gate assembly to the cutting tool of FIGS. 19-20.
Figure 23:
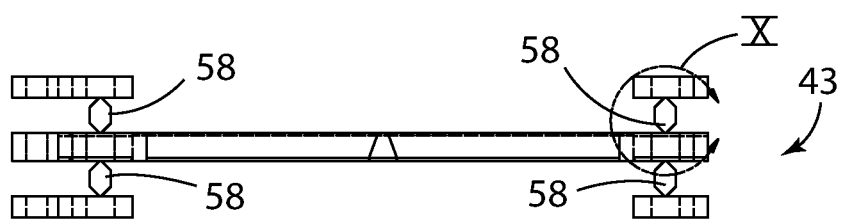
FIG. 23 is a front view of the end gate assembly to the cutting tool of FIGS. 19-20.
Figure 24:
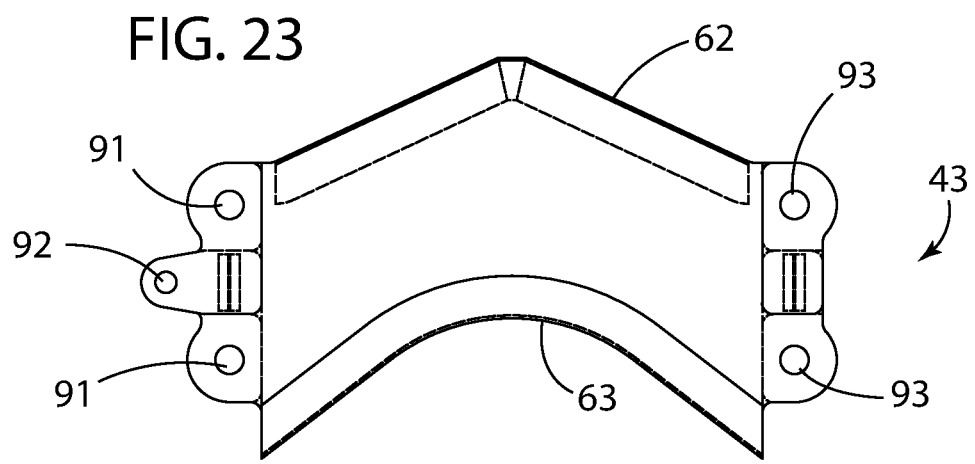
FIG. 24 is a top view of the end gate assembly to the cutting tool of FIGS. 19-20.
Figure 25:
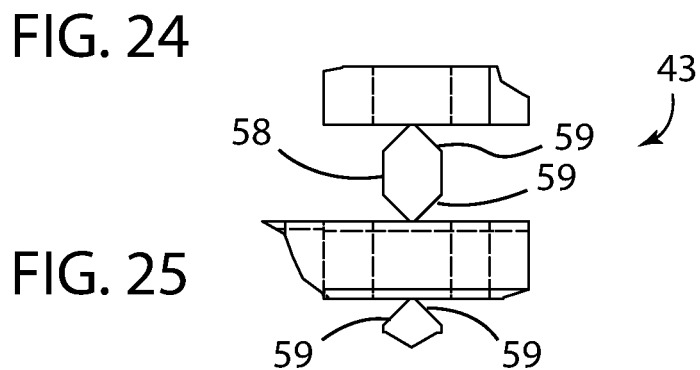
FIG. 25 is a partial side view of the end gate assembly to the cutting tool of FIGS. 19-20.

According to another approach, frame blade 46i can have an oblong concave arc and/or have two equal mirror image bevels (arrow shape) such as shown in FIGS. 16-18. In these figures, assuming for example a two-inch-thick blade, can have a cutting edge 69i one inch from the top and bottom of the blade and extending rearward from about 1.25 to 3 inches (90) or an angle of about 25-45 degrees (89). By way of example, cutting edge 69i can have an outside radius (87) of about 16 inches and a center radius 86 of about 10 inches. It is noted that the present configurations can allow a dimension 86 to be at least 2-3 inches and greater. In this case, end gate blade would preferably have the same shape blade (i.e., a reciprocal convex arrow shaped cutting edge (not shown) and oriented so that the cutting edges meet on the same plane.

Figure 28:
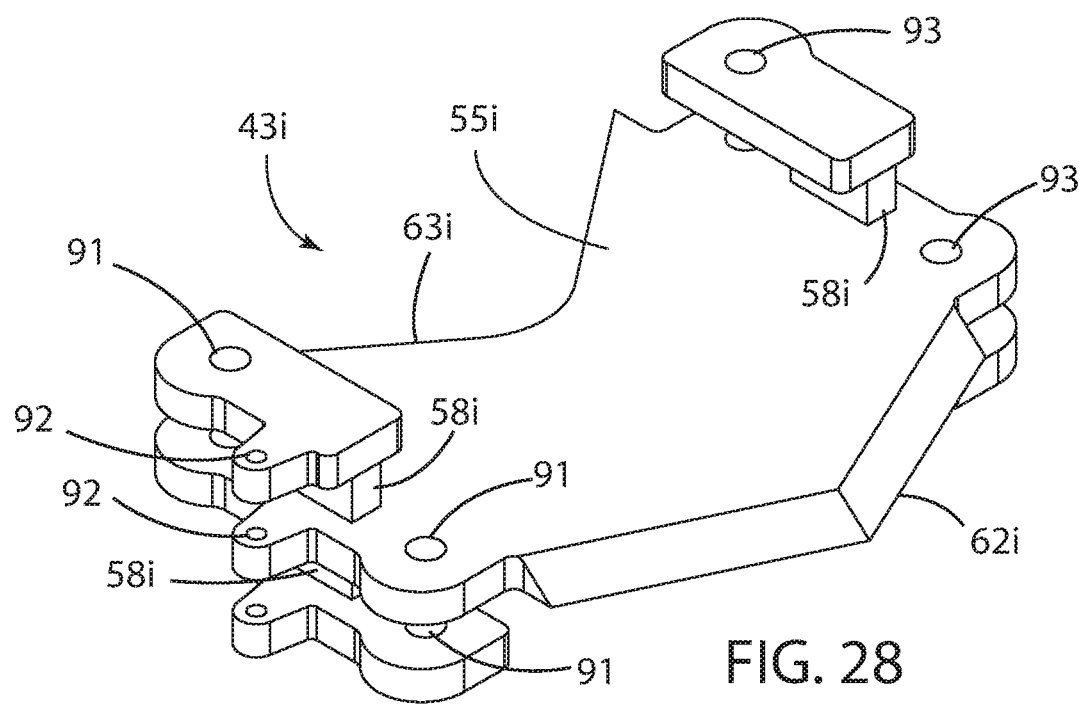
FIG. 28 is a top perspective front view of the blade of the end gate assembly of the present embodiments according to FIG. 26.
Figure 29:
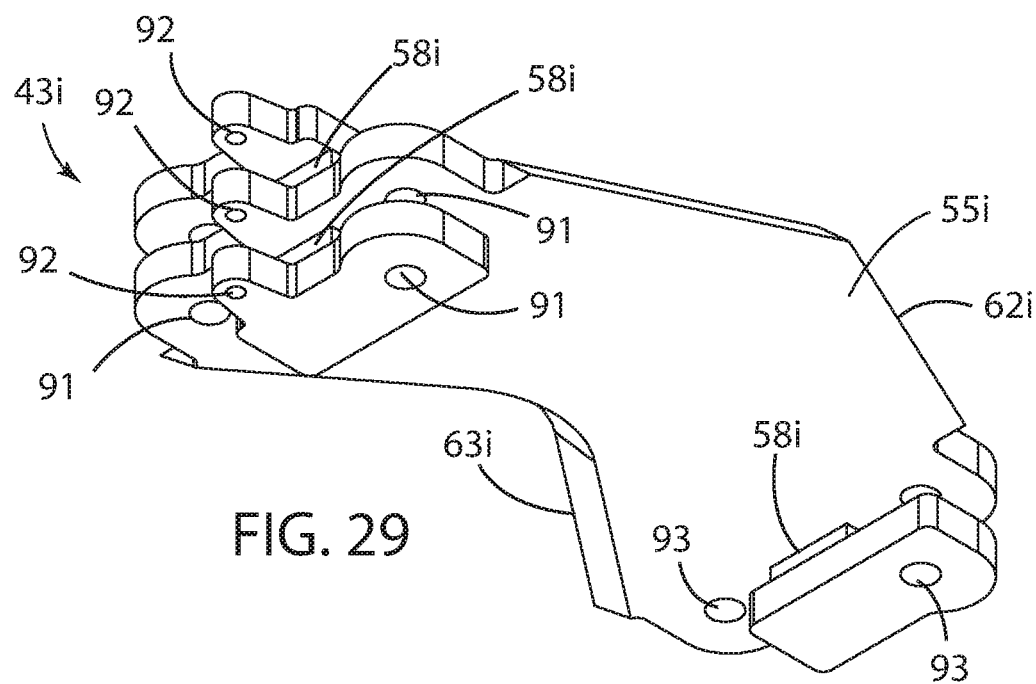
FIG. 29 is a bottom perspective front view of the blade of the end gate assembly of the present embodiments according to FIG. 26.
Figure 30:
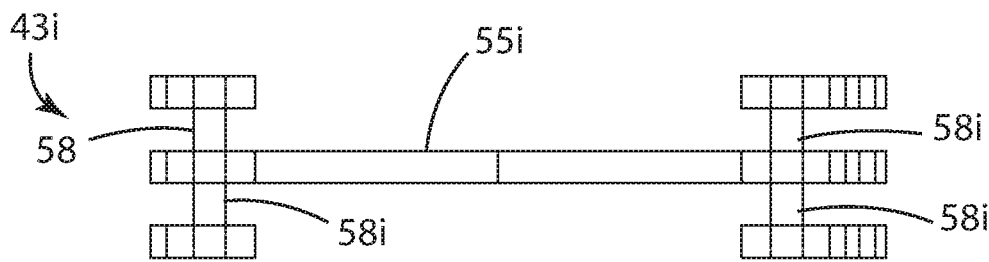
FIG. 30 is a rear planar view of the blade of the end gate assembly to the cutting tool of FIG. 26.
Figure 31:
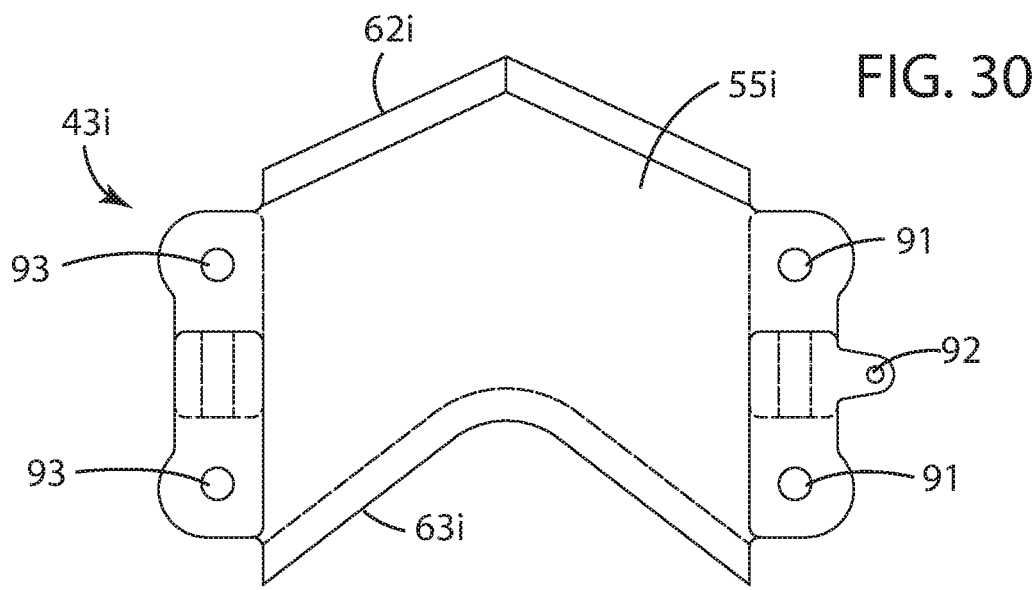
FIG. 31 is a bottom planar view of the blade of the end gate assembly to the cutting tool of FIG. 26.
Figure 32:
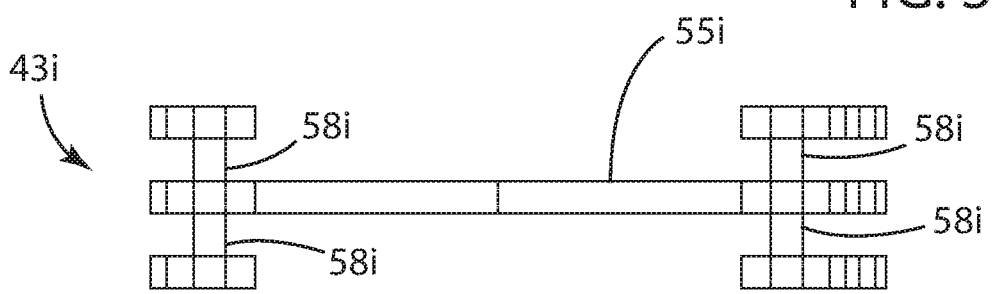
FIG. 32 is a front planar view of the blade of the end gate assembly to the cutting tool of FIG. 26.
Figure 33:
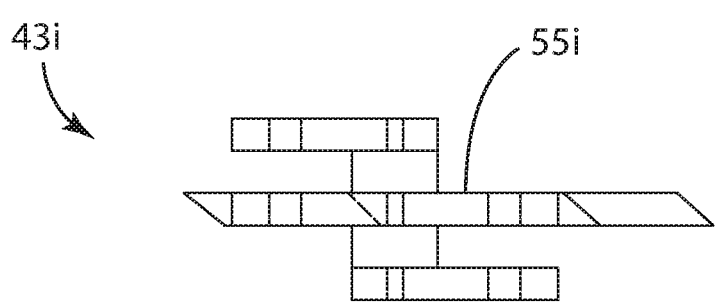
FIG. 33 is a right side planar view of the blade of the end gate assembly to the cutting tool of FIG. 26.
Figure 34:
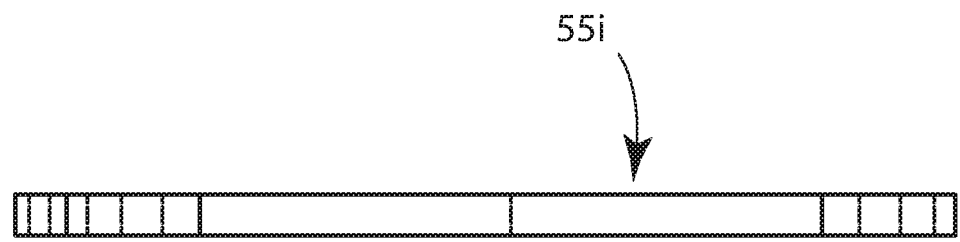
FIG. 34 is a rear planar view of the blade of the end gate blade to the cutting tool of FIG. 26.
Figure 35:
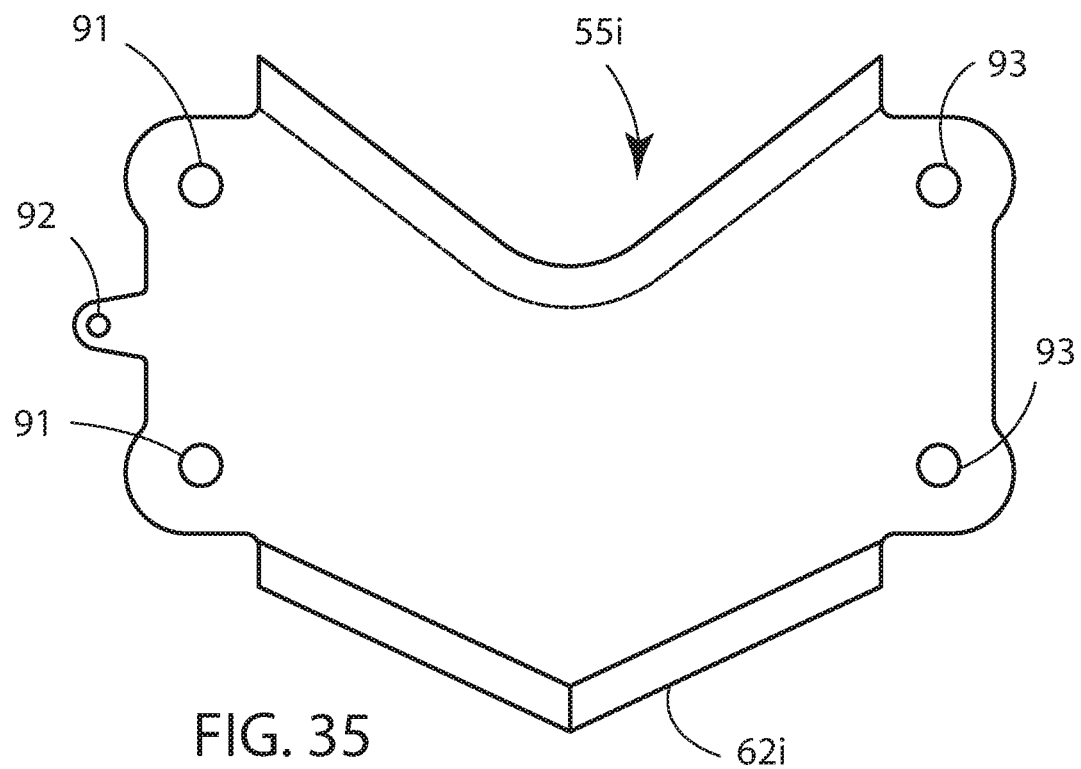
FIG. 35 is a bottom planar view of the blade of the end gate to the cutting tool of FIG.

In the figures an end gate assembly 43 is provided having brackets (56, 57, 60, 61) to mount end gate 43 to frame side rails 47, the brackets also being mounted to beveled/filet spacers 58 (or blocks 58i, see e.g., FIG. 28) having bevels 59, and end gate blade 55. The brackets have bores 91 for pin 53, bore 92 for pin 78, and bore 93 for pin 54. Pin 53 provides a pivot for end gate 43; pin 78 is the pivot pin for the hydraulic rod 97 for one side rail. Pin 54 provides a second end gate attachment on the opposite side rail 47. In the embodiments shown, end gate 43 has an end blade 55 that has two cutting surfaces 62 and 63. As mentioned herein, the cutting edges of the end gate blade and the frame blade are preferably adjacent to each other when the frame blade is extending to provide the shear to truncate the elongated member. Thus, as shown in FIG. 1, frame blade 46 has its cutting edge on the lower side of the blade. Accordingly, when the end gate is attached, end gate blade 55 has its cutting surface 63 on its top side and oriented so that its top side is oriented directly under frame blade cutting edge 69. The bevel for the end gate cutting edges are directed away from the interior of the frame. When cutting surface 62 is directed to the interior of the frame, again, its cutting edge is adjacent to cutting edge 69. This is accomplished by the reciprocal brackets for attachment of the end gate assembly.

Figure 26:
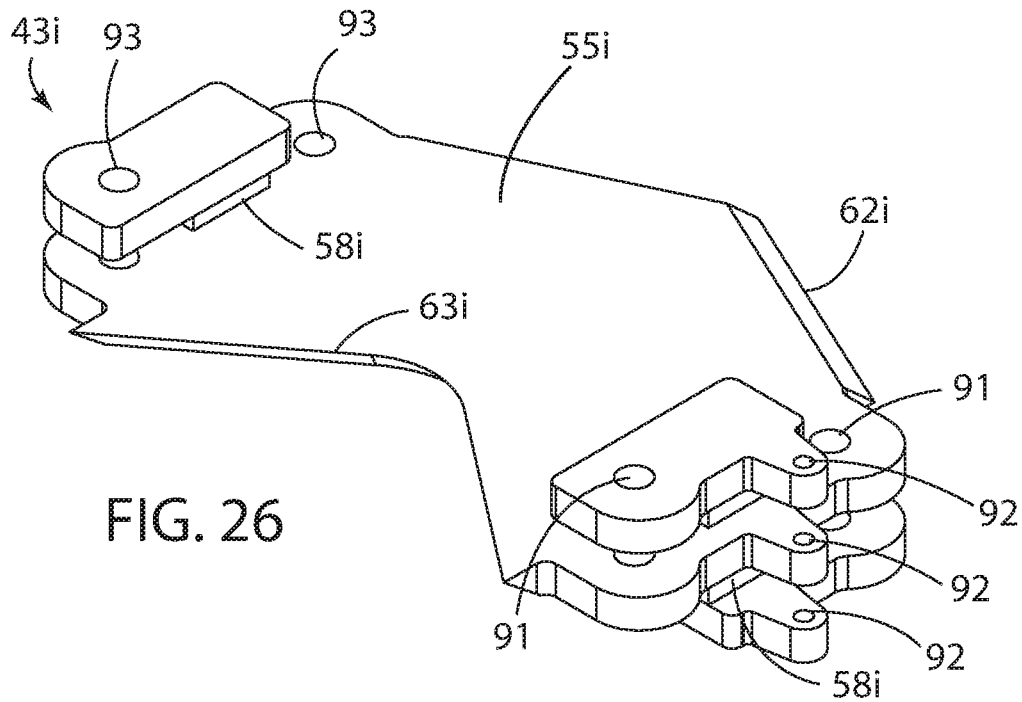
FIG. 26 is a top perspective rear view of the blade of the end gate assembly of the present embodiments according to another approach.
Figure 27:
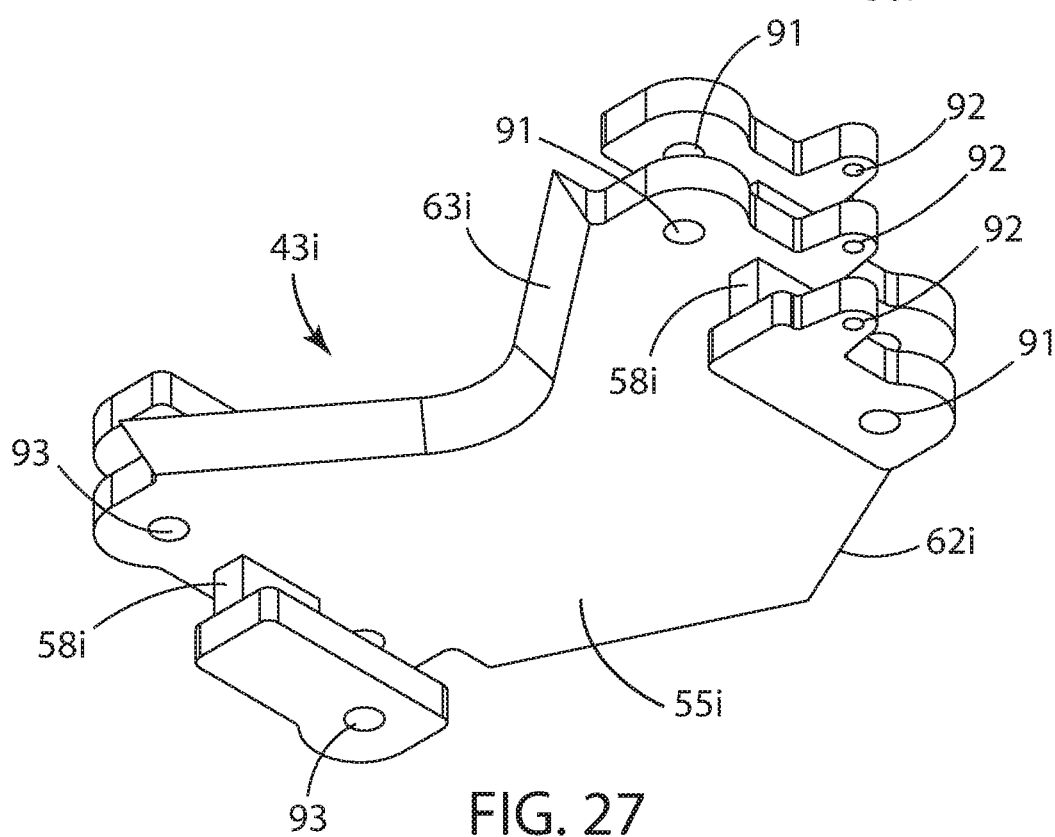
FIG. 27 is a bottom perspective rear view of the blade of the end gate assembly of the present embodiments according to FIG. 26.
Figure 37:
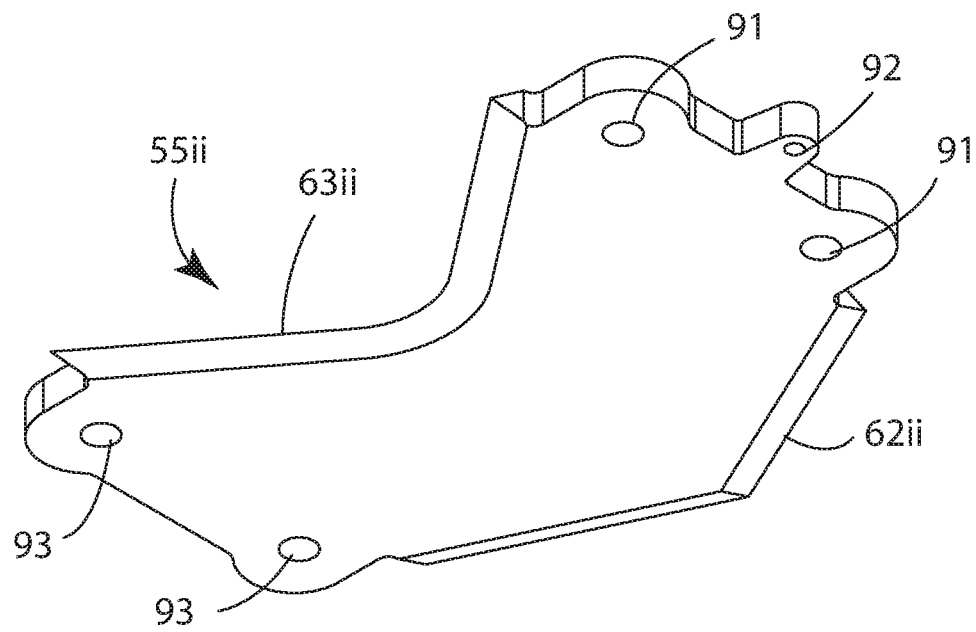
FIG. 37 is a bottom perspective view of the blade of FIG. 36.
Figure 38:
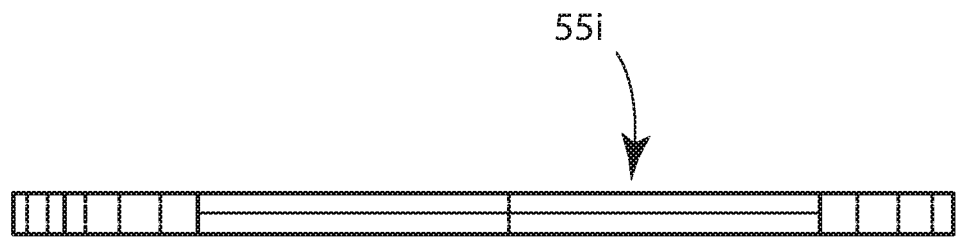
FIG. 38 is a front planar view of the blade of FIG. 36.
Figure 39:
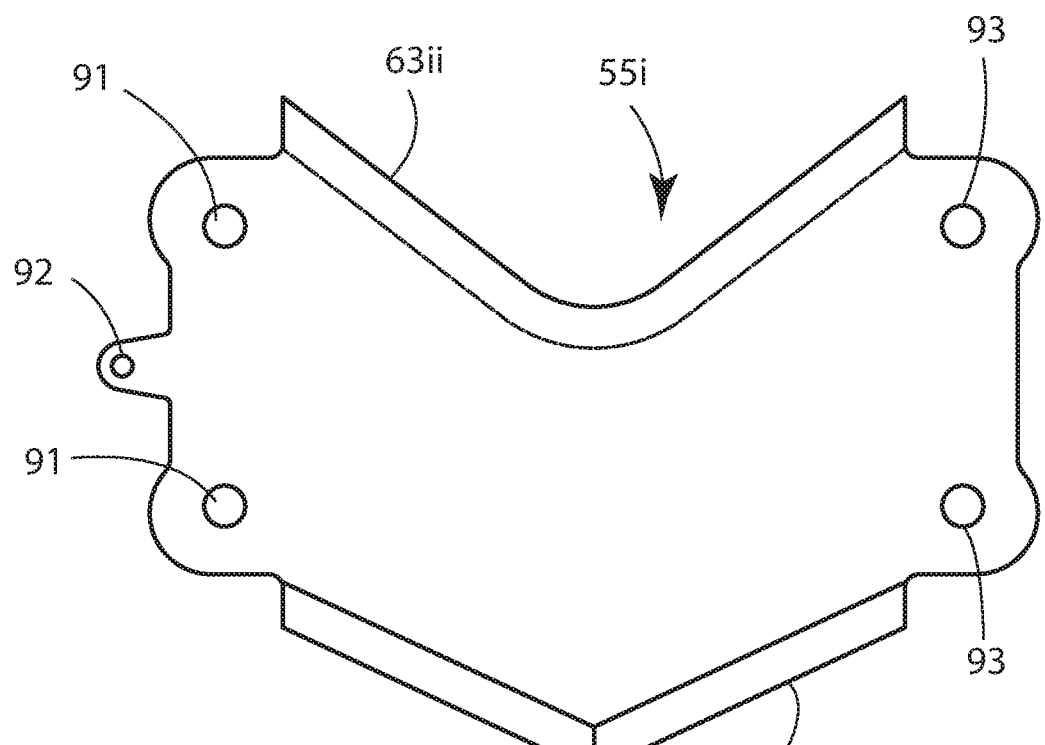
FIG. 39 is a top planar view of the blade of FIG. 36.
Figure 40:
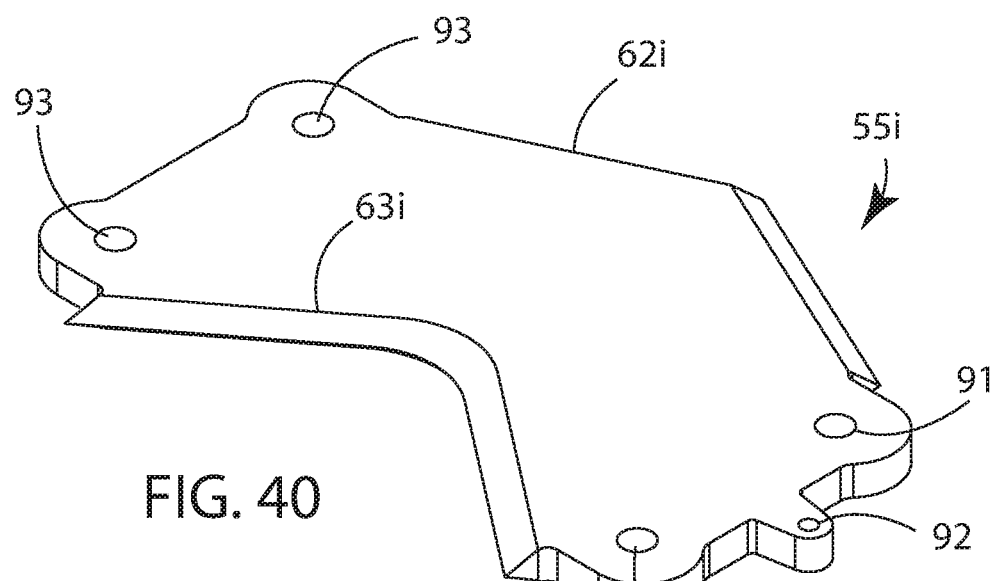
FIG. 40 is a top perspective view of the end gate blade to the cutting tool of FIGS. 26-27.
Figure 41:
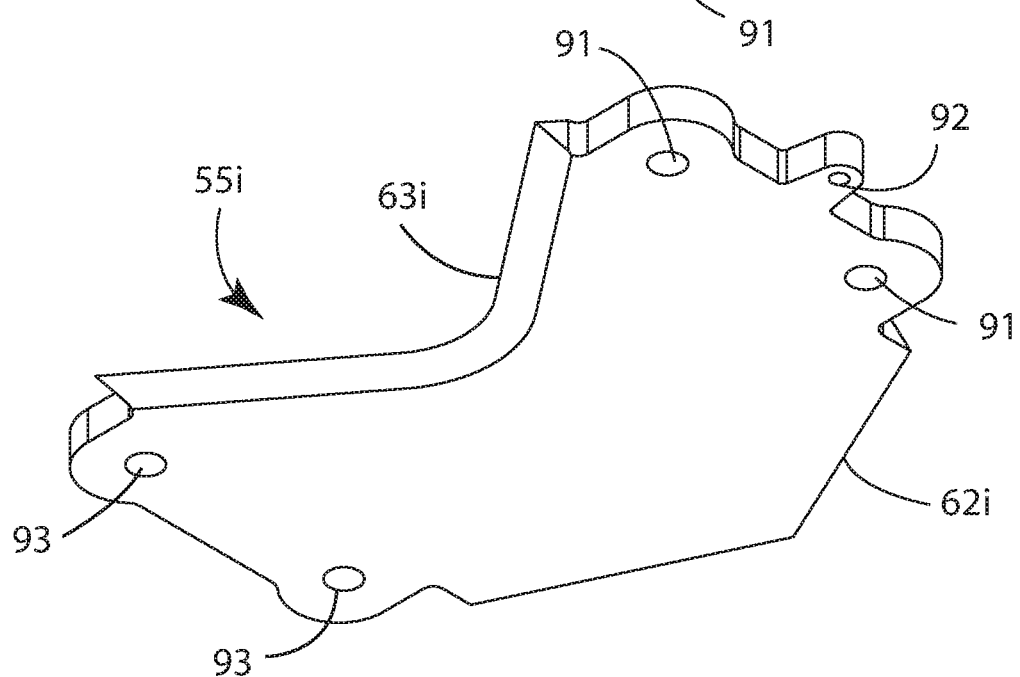
FIG. 41 is a bottom perspective view of the end gate blade to the cutting tool of FIGS. 26-27.

FIGS. 19-41 show various blade assembly configurations and blade configurations. Cutting edge 62 can be useful for cutting thick walled steel tubes. Cutting edge 63 can be useful cutting large diameter elongated members as described herein. Cutting edge 63i of FIGS. 26-27 can be useful for cutting large diameter work pieces, while cutting edge 62i can provide addition piercing capability. Cutting edge 63ii of FIGS. 36-37 can be useful for cutting or crushing large diameter work pieces, while cutting edge 62i can provide addition piercing and crushing capability. It is noted that in this embodiment, frame blade 46 would need to have a reciprocal surface (not shown) and the mounting brackets adjusted so that the blades are on the same plane. In another embodiment, the end gate can have three cutting edges on the same plane in a triangular formation.

In one embodiment of FIGS. 1-5, end gate 43 is also equipped with a downwardly beveled first cutting edge 62 and an upwardly beveled cutting edge 63 on opposite sides of end gate blade 55. In FIG. 5 cutting edge 62 faces cutting edge 69 on frame blade 46. In FIG. 1-4 cutting edge 63 faces cutting edge 69 on frame blade 46. As blade 46 is moved toward end gate 43 as show as direction 72, cutting edges 69 and 63 (or alternately cutting edges 69 and 62) can work together to shear a metal structural member. The member may be deformed by the force of blade 46 moving toward end gate 43. The shearing action may partially or completely sever the metal structural member into two separate sections, despite any deformation in the metal structural member.

Figure 6:
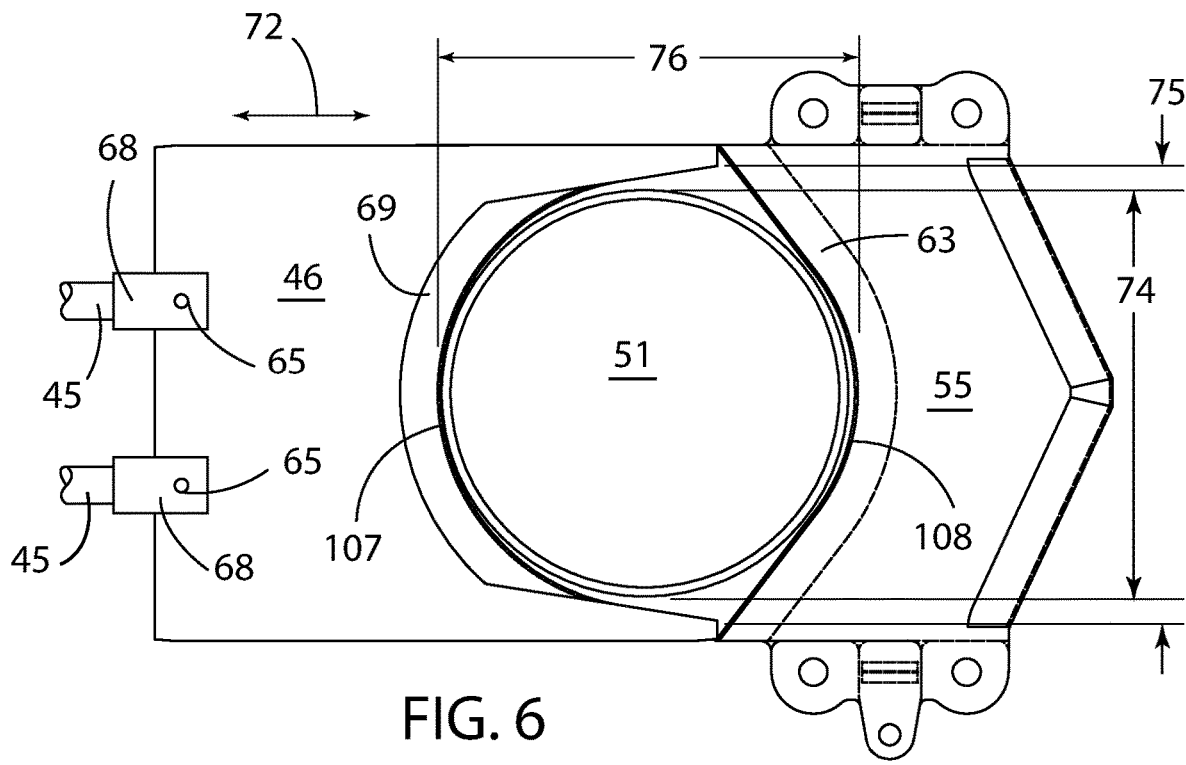
FIG. 6 is a top view of the blades of a cutting tool according to one approach of the present embodiments with its end gate in a closed position and a first end gate cutting edge directed to a frame interior and the frame blade retracted to receive a work piece.
Figure 7:
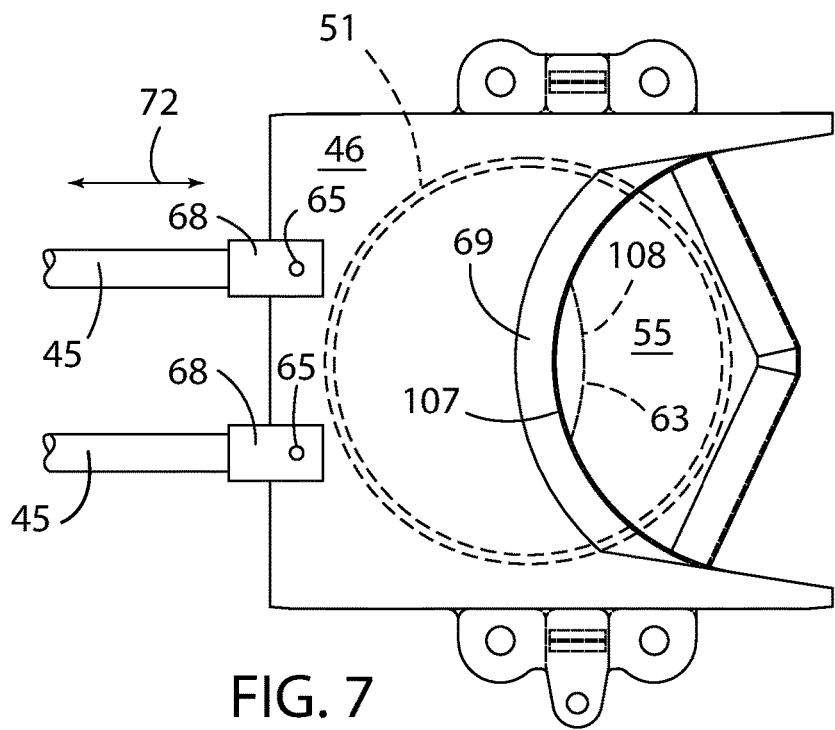
FIG. 7 is the top view of the blades of a cutting tool according to FIG. 6 with its end gate in a closed position and a first end gate cutting edge directed to a frame interior and the frame blade extended to truncate a work piece.

FIGS. 6-7 show top views of the orientation of frame blade 46 and end gate blade 55 during a truncation of an elongated member 51. As shown, workpiece 51 is a hollow steel piling such as shown in FIG. 9. The blades of cutting tool 40 have already enclosed workpiece 51 by positioning the frame blade 46 adjacent to the work piece 51, then closing end gate 43. As shown, when the cavity is formed there is sufficient room for the work piece. It is preferred to leave approximately one or two inches of 'play' within the blade enclosure.

While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of the appended claims. Throughout this specification and the drawings and figures associated with this specification, numerical labels of previously shown or discussed features may be reused in another drawing figure to indicate similar features.

LIST OF REFERENCE NUMBERS

40 cutting tool
41 frame
42 cabling to hold cutting tube 40
43 end gate assembly
44 hydraulic cylinder to move frame blade
45 hydraulic rod
46 frame blade
47 side rails
48 cross member
49 gate hydraulic cylinder
50 crane (FIG. 9)
51 work piece to cut (FIG. 6, 7, 9)
52 barge (FIG. 9)
53 pivot pin for end gate
54 locking pin for end gate
55 end gate blade
56 bottom left bracket
57 top right bracket
58 spacers (beveled); 58i (square)
59 beveled edges to allow welding penetration
60 top left bracket
61 bottom right bracket
62 first cutting edge
63 second cutting edge
64 distal opening 64 of frame blade 46
65 cylinder pins
66 support plate
67 side rail channel
68 brackets for frame blade
69 frame blade cutting edge
70 frame blade bevel
71 cylinder pin holes 72 direction of frame blade
73 direction of gate opening
74 work piece diameter
75 span of opening in frame blade
76 span between cutting edges of frame blade and gate blade and
travel of frame blade
78 gate hydraulic pin
80 mechanized pin pull
81 frame blade end bevel dimension
82 frame blade end bevel dimension
83 frame blade end bevel
84 radius of gate blade concave
85 frame blade bevel depth
86 oblong blade second radius (FIG. 16)
87 oblong blade first radius (FIG. 16)
89 dual bevel angle (FIG. 18)
90 dual bevel dimension (FIG. 18)
91 bore for pin 53
92 bore for pin 78
93 bore for pin 54
94 first end of side rails 47
95 second end of side rails 47
96 second end mounting brackets
97 end gate hydraulic rod
98 frame blade thickness
99 optional second bevel
100 depth of second bevel
101 height of second bevel
102 frame blade width
103 frame blade length
104 frame blade 46 extensions
105 frame blade 46 extensions arc (about 18 degrees)
106 frame blade 46 extenders
107 concave center of frame blade 46
108 concave center of end blade 55

I claim:

1. A cutting tool for truncating elongated structural members, said cutting tool comprising:
a frame with a pair of parallel siderails being a first siderail and a second siderail connected at a first end by a support plate and at a second end by a removable end gate, the frame having an open center adapted to receive one of the structural members therethrough,
an integral fixed penetrating first cutting edge on a first side of the end gate open to the open center of the frame,
a driven penetrating blade slidably disposed within the frame, and
a mechanism connected to the driven penetrating blade to drive the driven penetrating blade towards the structural member to sever the structural member, and
slidable mounts to secure and guide the driven penetrating blade on the frame to allow for movement across the open center of the frame towards the integral fixed penetrating first cutting edge,
wherein the end gate has an integral second cutting edge pointing in an opposite direction to the integral fixed penetrating first cutting edge of the end gate;
wherein the driven penetrating blade and the integral fixed penetrating first cutting edge have concave cutting edges relative to one another and configured to be adjacent to one another along a travel of the driven penetrating blade;
wherein the end gate connections to the pair of parallel siderails is
a pivotable removable mount by a first pin on the first siderail and
a lockable extendable and retractable mount by a second pin on the second siderail, and
wherein the end gate pivots about the pivotable removable mount in response to activation by a hydraulic cylinder on a plane horizontal to a plane of the integral second cutting edge of the end gate; and
wherein the lockable extendable and retractable mount extends and retracts in a direction perpendicular to the plane of the integral second cutting edge of the end gate in response to activation of a hydraulic cylinder of the lockable extendable and retractable mount.

2. The cutting tool of claim 1, wherein each of the cutting edges has a single bevel.

3. The cutting tool of claim 2, wherein an angle of the bevel of the driven penetrating blade is positioned to tilt and direct the structural member away from the frame of the cutting tool and towards the end gate during cutting, the leading edges of the cutting edges being adjacent to one another,
wherein the driven penetrating blade is a 2 inches thick plate and a length of the bevel is 3 inches, and
wherein the bevel of the driven penetrating blade slopes downwardly to the cutting edge relative to a top of the cutting tool having suspension cables.

4. The cutting tool of claim 1, wherein the cutting edge of the driven penetrating blade and the cutting edge of the integral fixed penetrating first cutting edge define a frame opening.

5. The cutting tool of claim 3, wherein the frame opening is generally circular when both edges initially meet each other.

6. The cutting tool of claim 1, wherein the driven penetrating blade is partial oblong shape.

7. The cutting tool of claim 1, wherein the first cutting edge of the driven penetrating blade defines a collective concave profile corresponding to a profile of the structural member.

8. The cutting tool of claim 1, wherein an angle of a bevel on the cutting edges is in a range of 25-75 degrees.

9. The cutting tool of claim 8, wherein the angle of the bevel on the cutting edges is 45 degrees.

10. A cutting tool for truncating elongated structural members, said cutting tool comprising:
a frame with a pair of parallel siderails being a first siderail and a second siderail connected at a first end by a support plate and at a second end by a removable end gate,
the frame having an open center adapted to receive one of the structural members therethrough,
an integral fixed penetrating first V-shaped piercing cutting edge on a first side of the end gate,
an integral fixed penetrating second partial circular shaped cutting edge on a second side of the end gate pointing in an opposite direction to the integral fixed penetrating first V-shaped piercing cutting edge,
a driven penetrating blade having a concave partial circular cutting edge slidably disposed within the frame,
wherein the end gate is selectable to direct either the integral fixed penetrating first V-shaped piercing cutting edge or the integral fixed penetrating second circular shaped cutting edge towards the open center,
a mechanism connected to the driven penetrating blade to drive the driven penetrating blade towards the structural member to sever the structural member, slidable mounts to secure and guide the driven penetrating blade on the frame to allow for movement across the open center of the frame towards whichever of the integral fixed penetrating first V-shaped piercing cutting edge or the integral fixed penetrating second circular shaped cutting edge is directed to the open center, wherein the end gate connections to the pair of parallel siderails is a first lockable extendable and retractable mount by a first pin on the first siderail and a second lockable extendable and retractable mount by a second pin on the second siderail, and wherein the first pin and the second pin extend and retract in a direction perpendicular to a plane of the end gate cutting edges in response to activation of a first hydraulic cylinder and a second hydraulic cylinder respectively.

\* \* \* \* \*